(12) United States Patent
Ishitori et al.

(10) Patent No.: US 10,356,262 B2
(45) Date of Patent: Jul. 16, 2019

(54) IMAGE PROCESSING APPARATUS AND IMAGE PROCESSING METHOD

(71) Applicants:Atsushi Ishitori, Tokyo (JP); Takahisa Yamaguchi, Tokyo (JP)

(72) Inventors: Atsushi Ishitori, Tokyo (JP); Takahisa Yamaguchi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/427,493

(22) Filed: Feb. 8, 2017

(65) Prior Publication Data
US 2017/0244850 A1 Aug. 24, 2017

(30) Foreign Application Priority Data
Feb. 19, 2016 (JP) .................................. 2016-030011

(51) Int. Cl.
| | | |
|---|---|---|
| *H04N 1/00* | (2006.01) | |
| *G06K 9/00* | (2006.01) | |
| *G06K 9/32* | (2006.01) | |
| *G06F 3/12* | (2006.01) | |
| *G06K 15/02* | (2006.01) | |

(52) U.S. Cl.
CPC ..... *H04N 1/00777* (2013.01); *G06K 9/00449* (2013.01); *G06K 9/3233* (2013.01); *H04N 1/0044* (2013.01); *H04N 1/00702* (2013.01); *H04N 1/00708* (2013.01); *G06K 2209/01* (2013.01); *H04N 2201/0081* (2013.01); *H04N 2201/0094* (2013.01)

(58) Field of Classification Search
None
See application file for complete search history.

(56) References Cited

U.S. PATENT DOCUMENTS 6,751,780 B1 * 6/2004 Neff ..................... H04N 1/3873
358/1.18
6,888,650 B1 * 5/2005 Mizubata ........... H04N 1/00681
358/1.2

(Continued)

FOREIGN PATENT DOCUMENTS

| | | | | |
|---|---|---|---|---|
| GB | 2528999 | * | 2/2016 | ............. G07D 11/00 |
| JP | 2007-102265 | | 4/2007 | |

(Continued)

*Primary Examiner* — Beniyam Menberu
(74) *Attorney, Agent, or Firm* — IPUSA, PLLC

(57) ABSTRACT

An image processing apparatus is provided for scanning a medium including a scan region where target information is provided. The image processing apparatus implements processes of running an application for generating an electronic document; controlling the application to instruct a scanning device to scan the medium at a specified scan size, which is smaller than the size of the medium and includes at least the scan region, upon accepting a scan instruction from a user; controlling the scanning device to scan the medium and capture image data of the medium at the specified scan size based on the instruction from the application; executing a character recognition process on the image data captured by the scanning device to acquire the target information; and controlling the application to generate the electronic document including the target information acquired by the character recognition process input to a corresponding input field.

29 Claims, 27 Drawing Sheets

(56) References Cited

U.S. PATENT DOCUMENTS

| | | | |
|---|---|---|---|
| 8,333,327 B2 | 12/2012 | Akiyama | |
| 8,913,285 B1* | 12/2014 | Neubrand | H04N 1/3873 358/1.9 |
| 2003/0023625 A1* | 1/2003 | Thomason | G06F 17/243 715/225 |
| 2003/0038227 A1* | 2/2003 | Sesek | H01L 27/146 250/208.1 |
| 2004/0057581 A1* | 3/2004 | Rhoads | H04N 1/32144 380/59 |
| 2004/0240894 A1* | 12/2004 | Tomita | G03G 15/5062 399/17 |
| 2005/0242172 A1* | 11/2005 | Murata | G06Q 20/10 235/380 |
| 2006/0198526 A1* | 9/2006 | Saito | H04K 1/00 380/287 |
| 2007/0195378 A1* | 8/2007 | Yoshida | H04N 1/00795 358/470 |
| 2008/0225353 A1* | 9/2008 | Imafuku | H04N 1/00681 358/488 |
| 2008/0266617 A1* | 10/2008 | Suzuki | H04N 1/401 358/474 |
| 2009/0161175 A1* | 6/2009 | Fujishita | H04N 1/00002 358/474 |
| 2010/0161460 A1* | 6/2010 | Vroom | G06Q 40/02 705/31 |
| 2011/0060450 A1* | 3/2011 | Drenth | G07B 17/00467 700/221 |
| 2012/0019878 A1* | 1/2012 | Motoyama | H04N 1/00588 358/474 |
| 2016/0212298 A1* | 7/2016 | Hama | H04N 1/32133 |
| 2016/0350737 A1 | 12/2016 | Takai et al. | |

FOREIGN PATENT DOCUMENTS

| | | | | |
|---|---|---|---|---|
| JP | 2010-211738 | | 9/2010 | |
| JP | 2012-054758 | * | 3/2012 | H04N 1/04 |

* cited by examiner

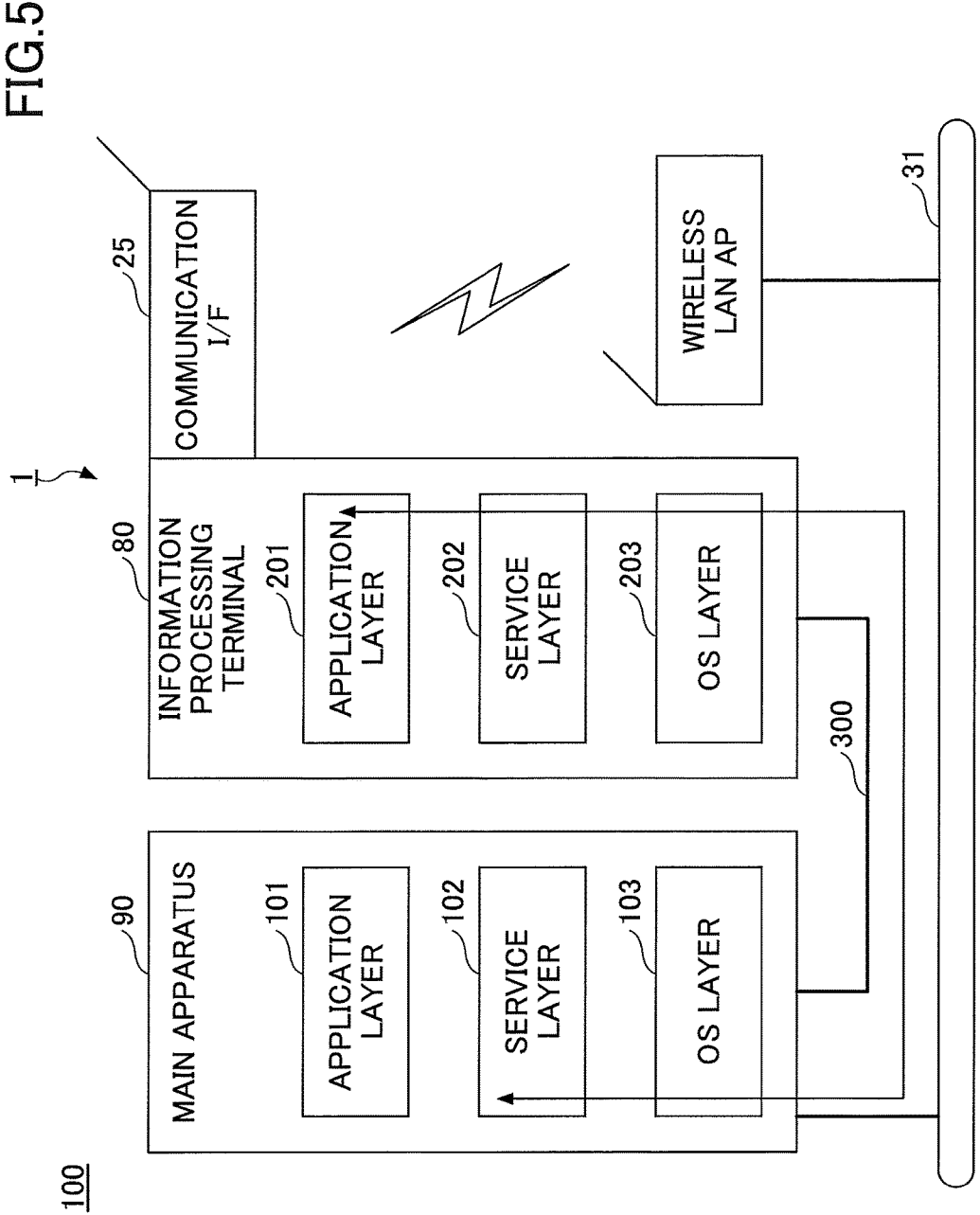

FIG.10A
FIG.10B
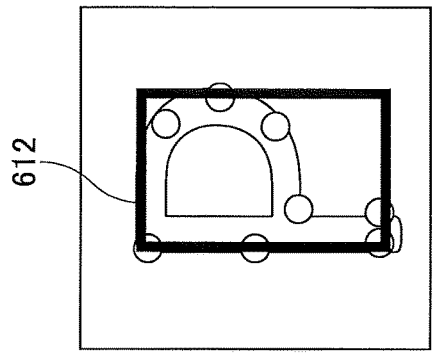
FIG.10C
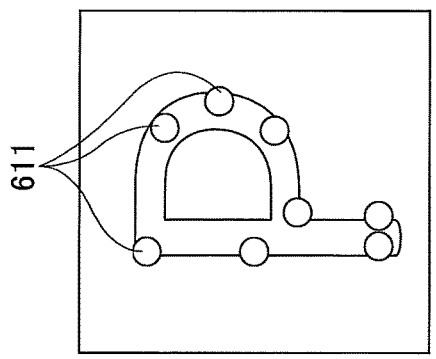
FIG.10D
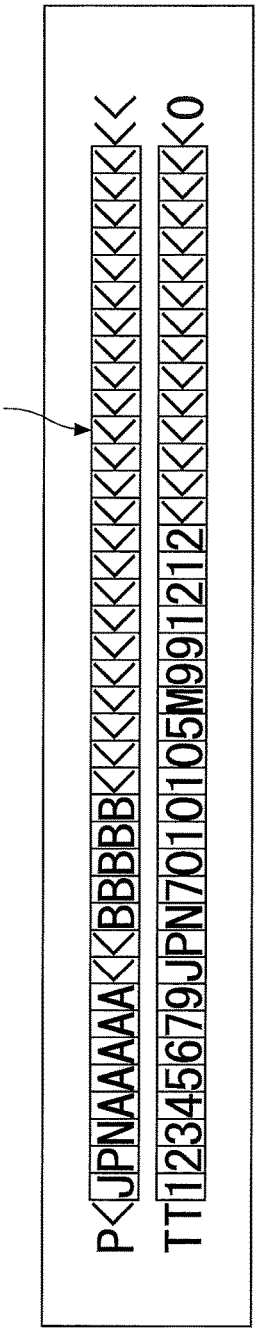

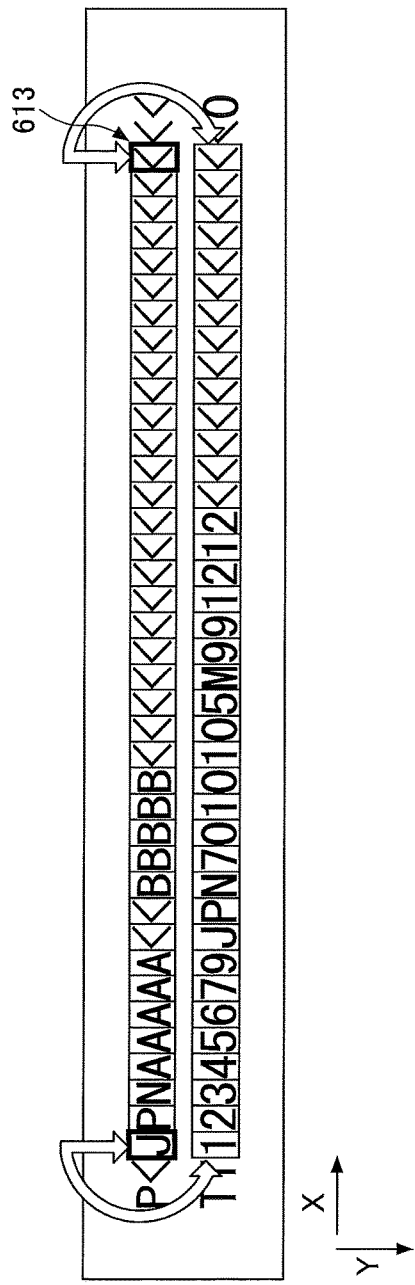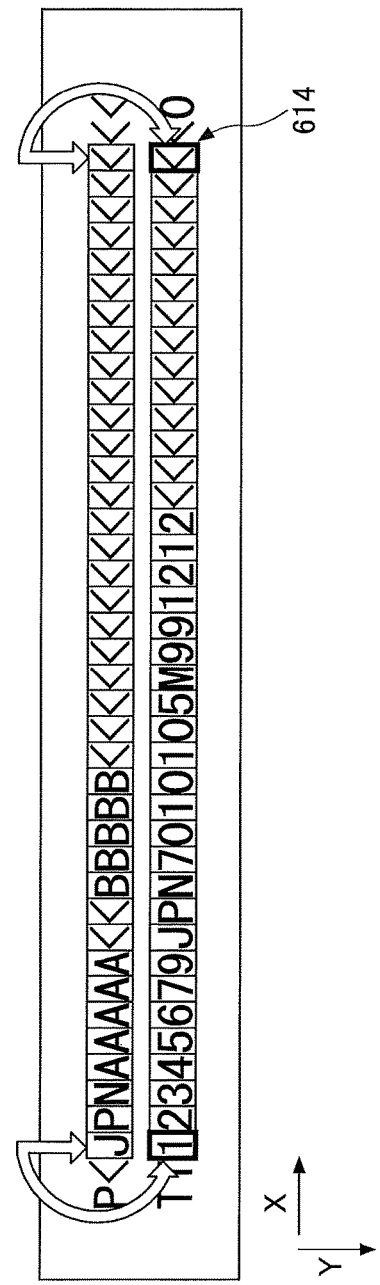

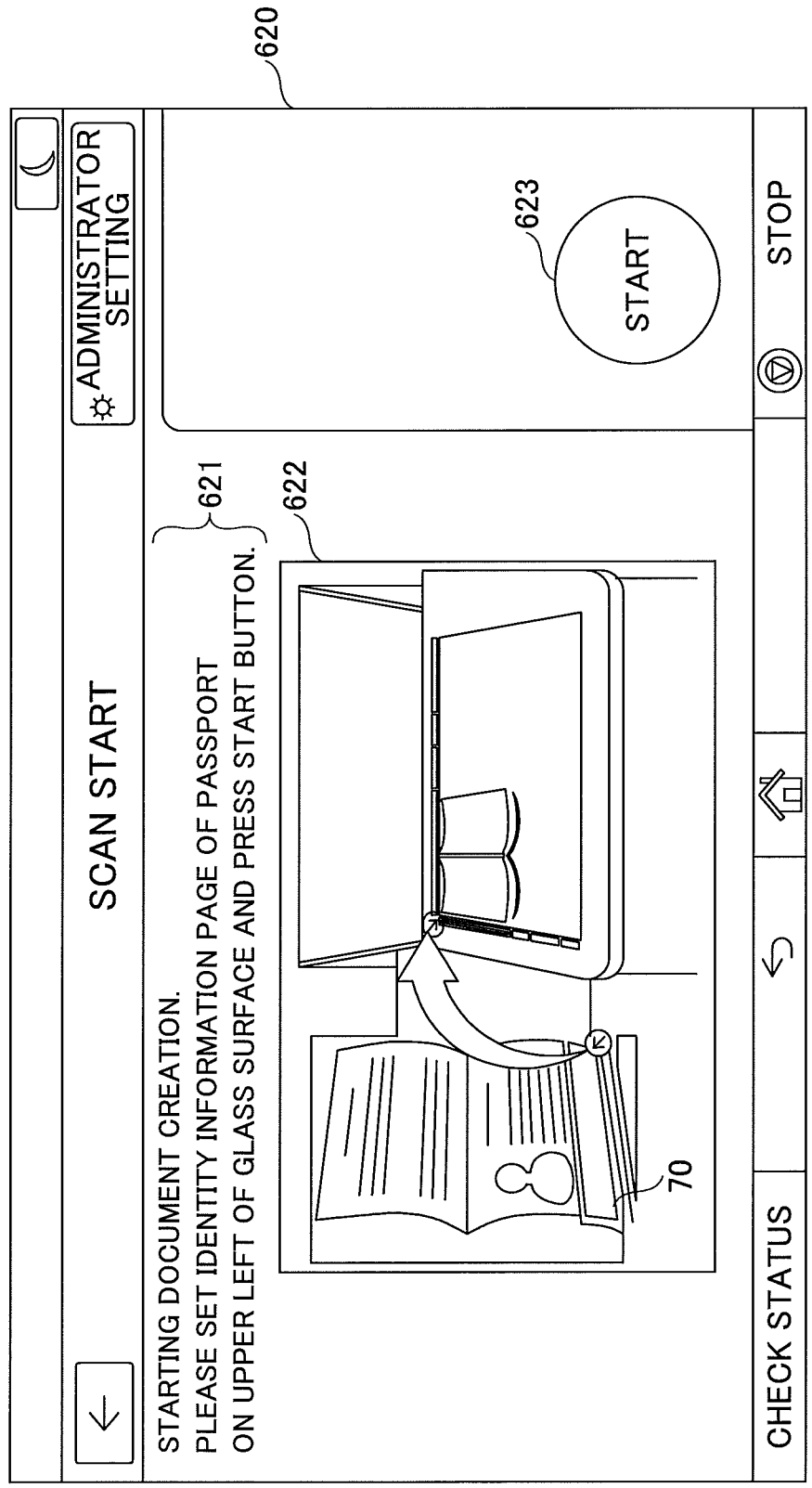

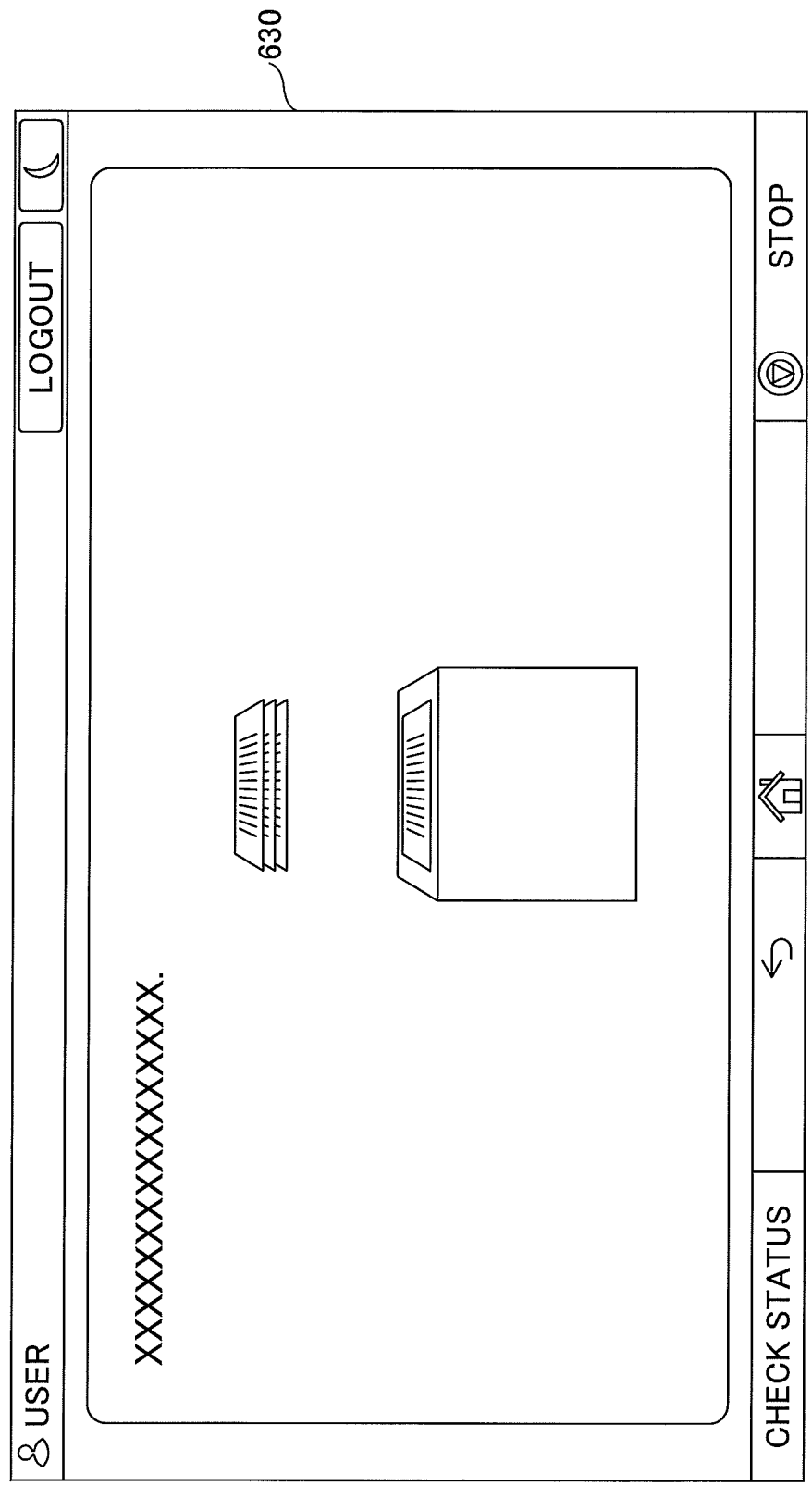

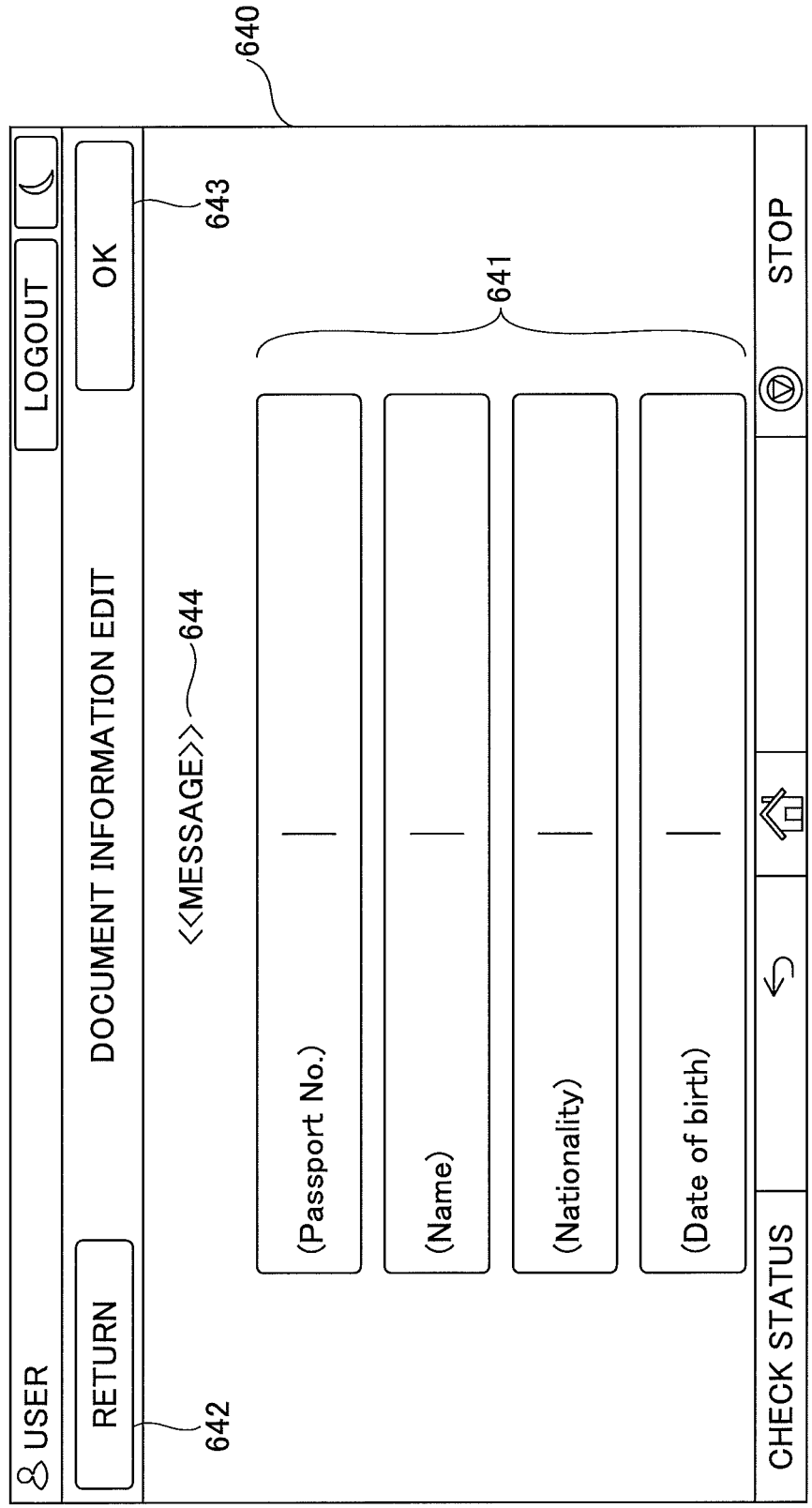

USER  
RETURN — 642  
DOCUMENT INFORMATION EDIT  
LOGOUT  
OK — 643

640

641
- (Date of landing)
- (Date of purchase)
- (Total amount(General))
- (Total amount(Supplies))

CHECK STATUS  STOP

FIG.15

DOCUMENT INFORMATION EDIT

⏻ USER  |  LOGOUT

RETURN ← 642

640

ERROR
THERE MAY BE ERRORS IN THE OCR RESULT... ← 644

641

OK ← 643

(Passport No.) xxxxxxxxxx (Name) xxxxxxxxxx (Nationality) xxx (Date of birth) 1980/11/1 🅿 ← 656

❗ ← 655

CHECK STATUS  |  STOP

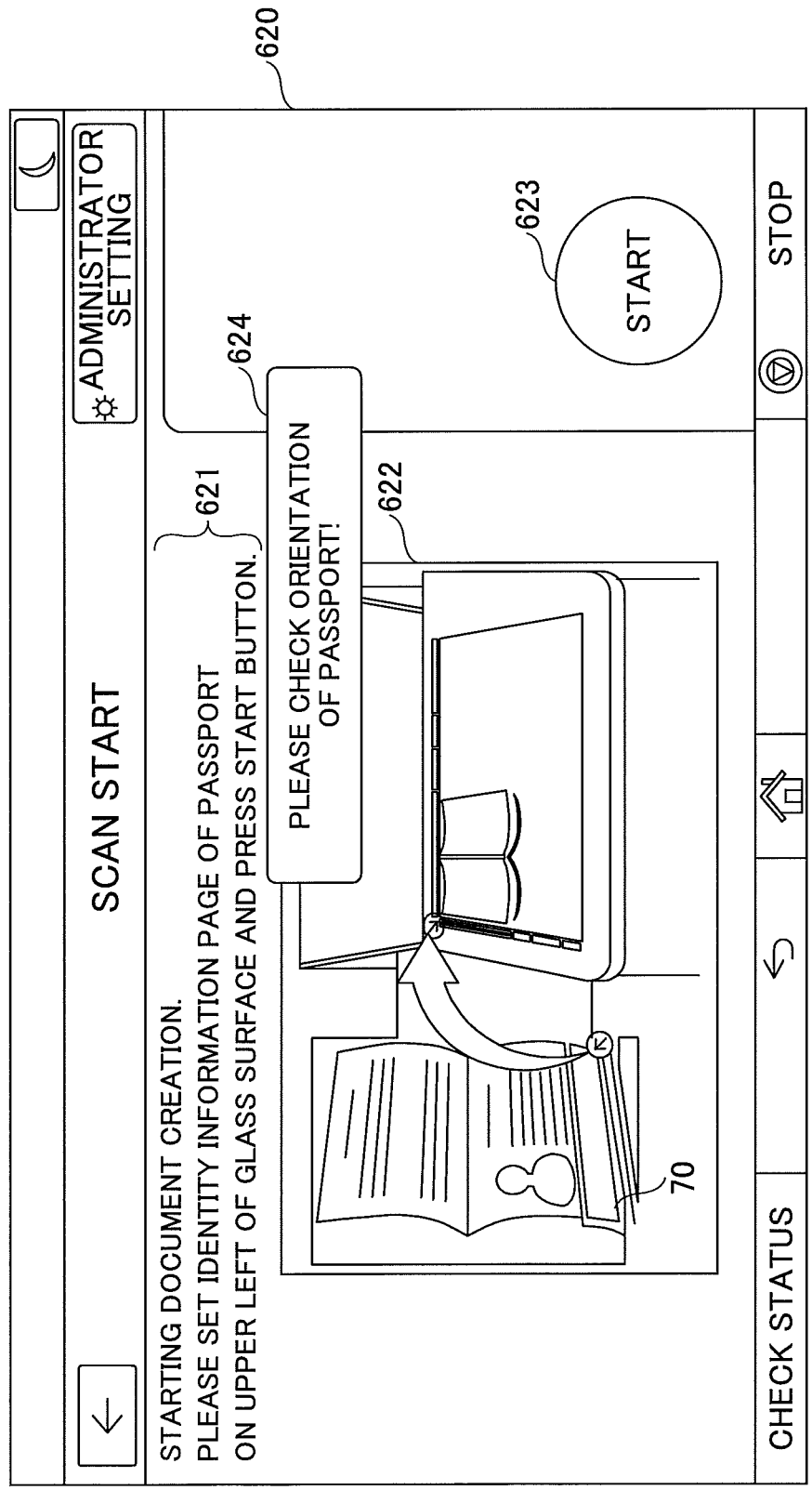

FIG.17A

[ATTACH TO PASSPORT]

Record of Purchase of Consumption Tax-Exempt for Export

| Tax office concerned | Seller's Name | |
|---|---|---|
| Place for Tax Payment | | |
| Selling Place | | |
| Date of Purchase | | |
| Total amount(General) | | |
| Total amount(Supplies) | | |
| Passport etc. PASSPORT | No. | |
| Status of Residence | Nationality | |
| Date of Landing | Date of Birth of Purchaser | |
| Name in Full(in block Letters) | | |

ATTACH RECEIPT

When departing Japan, or if becoming a resident of Japan, you are required to submit your "Record of Purchase Card" to either the Director of Customs that has jurisdiction over your departure location or the head of the tax office that has jurisdiction over your place of residence or address.

FIG.17B

Covenant of Purchase of Consumption Tax-Exempt for Ultimate Export   [FOR STORE USE]

I certify that the goods listed as "commodities" on this card were purchased by me for export from Japan within 30days from the purchase date and will not be disposed of within Japan.

I certify that the goods listed as "commodities except consumables" on this card were purchased by me for ultimate export from Japan and will not be disposed of within Japan.

I certify that any and all entries in this Covenant of Purchase are correct.

"Signature"

| Seller's Name | Date of Purchase | Passport etc. | No. |
|---|---|---|---|
| | | PASSPORT | |
| Total amount(General) | Total amount(Supplies) | Status of Residence | Nationality |
| | | | |
| ATTACH RECEIPT | | Date of Landing | Date of Birth of Purchaser |
| | | | |
| | | Name in Full(in block Letters) | |
| | | | |

IMAGE PROCESSING APPARATUS AND IMAGE PROCESSING METHOD

CROSS-REFERENCE TO RELATED APPLICATIONS

The present application claims priority under 35 U.S.C. § 119 to Japanese Patent Application No. 2016-030011 filed on Feb. 19, 2016, the entire contents of which are incorporated herein by reference.

BACKGROUND OF THE INVENTION

1. Field of the Invention

The present disclosure relates to an image processing apparatus and an image processing method.

2. Description of the Related Art

With the launch of the Revised Consumption Tax Exemption Program for Foreign Visitors in Japan on Oct. 1, 2014, products covered by the tax exemption program were enhanced to include consumable supplies (e.g., foodstuffs, beverages, medicines, cosmetics) in addition to general goods that were the only items previously covered by the program. As a result, even general stores, such as drug stores and convenience stores, selling consumable supplies are now allowed to sell tax-free products by applying for a tax-free shop permit. By being able to offer products to tourists tax-free (amounting to an 8% discount as of the filing date of the present application), these stores may be able to encourage purchasing of consumable supplies and thereby expand sales opportunities.

Note that while stores may benefit from expansion of sales through the offer of tax-free products, they also have certain obligations, such as (1) passport confirmation, (2) tax exemption sale document creation, (3) tax exemption sale document filing, (4) purchaser declaration procurement, and (5) document storage (7 years), for example. For this reason, a substantial increase in expenses is expected such that stores may be disinclined to apply for a tax-free shop permit.

For example, potential new tax-free stores may include small stores (e.g., a store that is not a chain store) and individual merchant stores belonging to a particular commercial shopping district that has applied for tax-free shop permits all together. For such stores, investment in equipment and systemization of tax exemption sale document creation may be quite burdensome.

For example, such stores may not be able to afford high-cost equipment dedicated for the creation of tax exemption sale documents. Thus, techniques are desired for enabling the creation of tax exemption sale documents using existing general-purpose office equipment (e.g., a copier or a scanner) that can be used for purposes other than tax exemption sale document creation, for example.

For example, Japanese Unexamined Patent Application Publication No. 2007-102265 describes a technique for supporting the creation of a document by extracting characters from a document scanned by a scanner. Specifically, Japanese Unexamined Patent Application Publication No. 2007-102265 describes an identification card recognition method for detecting characteristic characters indicated in an identification card.

SUMMARY OF THE INVENTION

According to one embodiment of the present invention, an image processing apparatus is provided that includes a scanning device configured to scan at least a portion of a medium including a scan region where target information is provided, a storage device configured to store an electronic document including a corresponding input field for inputting the target information, and a processor configured to execute a program stored in a memory. The processor executes the program to implement processes of running an application for generating the electronic document that includes the target information input to the corresponding input field; controlling the application to instruct the scanning device to scan the medium at a specified scan size, which is smaller than a size of the medium and includes at least the scan region, upon accepting a scan instruction from a user while the application is running; controlling the scanning device to scan the medium and capture image data of the medium at the specified scan size based on the instruction from the application; executing a character recognition process on the image data of the specified scan size of the medium captured by the scanning device to acquire the target information; and controlling the application to generate the electronic document including the target information acquired by the character recognition process input to the corresponding input field.

BRIEF DESCRIPTION OF THE DRAWINGS

FIG. 5 is a block diagram illustrating an example software configuration of the multifunction peripheral;

FIGS. 10A-10D are diagrams describing example process steps of a pre-process;

FIGS. 11A and 11B are diagrams describing further example process steps of the pre-process;

FIGS. 12A and 12B are diagrams illustrating example screens displayed on the multifunction peripheral when a document scan application is run on the multifunction peripheral;

FIGS. 13A-13C are diagrams illustrating portions of a document information edit screen;

FIG. 15 is a diagram illustrating an example document information edit screen that may be displayed when an error condition is detected;

FIGS. 16A-16C are diagrams describing detection of the orientation of a passport;

FIGS. 17A and 17B are diagrams respectively illustrating a "Record of Purchase of Consumption Tax-Exempt for Export" and a "Covenant of Purchase of Consumption Tax-Exempt for Ultimate Export" that are to be printed;

DESCRIPTION OF THE EMBODIMENTS

Figure 1:
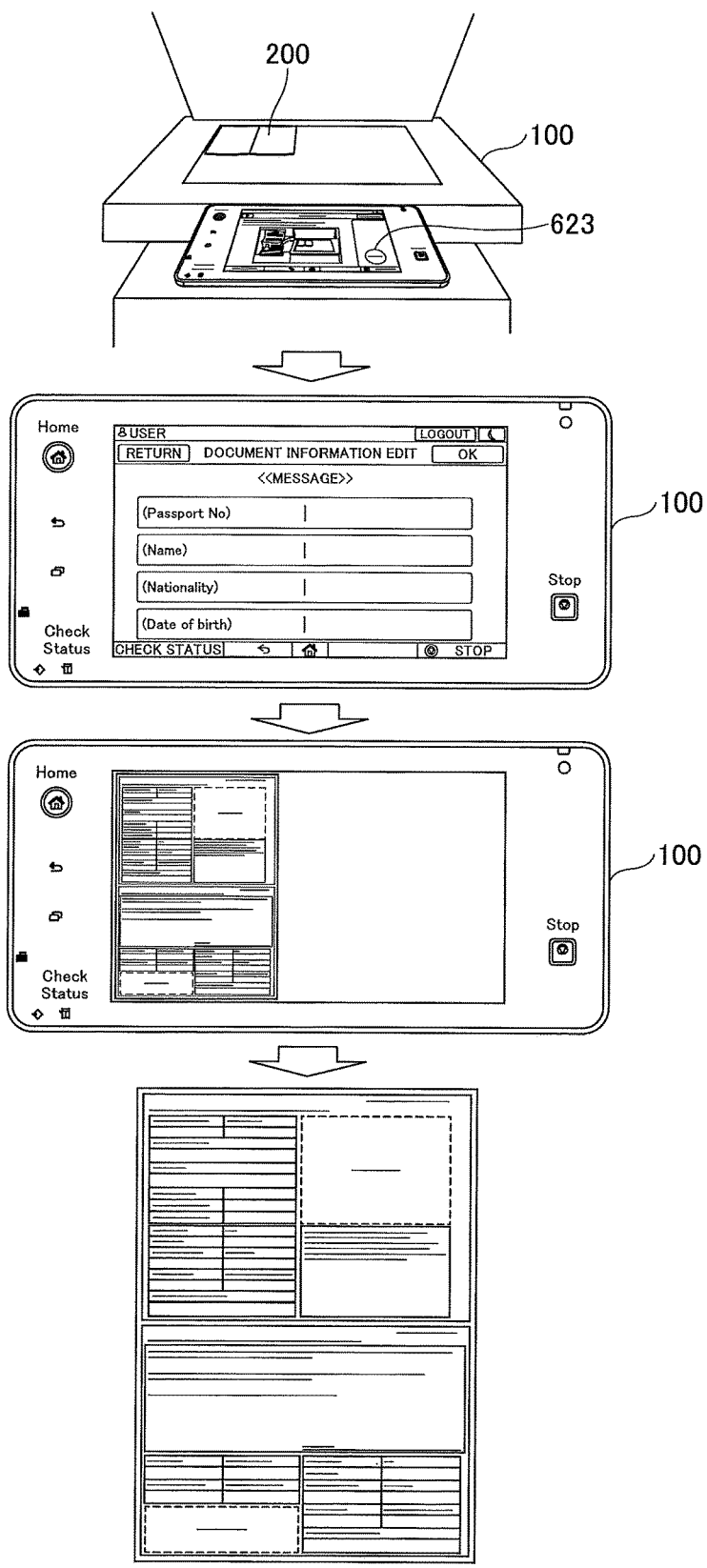
FIG. 1 is a schematic diagram describing an example operation in which a multifunction peripheral scans a document to acquire information from the document and outputs the acquired information.

Typically, scan functions of a general-purpose copier or scanner include (i) automatically determining the size of a document and scanning the entire document at the determined size; or (ii) having a user specify the size of a document and scanning the document at the specified size.

In the case of using the scan function (i) described above, a scanner may scan an entire document and perform an OCR (optical character recognition) process on image data of the entire document that has been scanned. That is, even when information indicated in a portion of the document is desired, the entire document has to be scanned. Thus, a substantial amount of time is required for scanning the document, performing the OCR process, and extracting desired text information from text information acquired by the OCR process. As such, when the scan function (i) is used to create tax exemption documents, for example, the time required for executing business administrative processes at a store may substantially increase.

In the case of using the scan function (ii) described above, because the scanner is a general-purpose scanner, a corresponding document size has to be specified by a store clerk each time he/she wishes to create a tax exemption document, for example. That is, extra time is required for specifying the document size. Also, when the store clerk makes an error and specifies the wrong document size, for example, the scanning process has to be performed all over again to thereby require even more extra time. Thus, as in the case of using the scan function (i), the time required for executing business administrative processes at a store may substantially increase when the scan function (ii) is used to create tax exemption documents, for example. Note that the above issue relating to time consumption is not limited to the case of creating tax exemption documents but occurs in any process for generating an electronic document by scanning a document and performing an OCR process thereon to acquire target information included in the document where the target information is included in only a portion of the document, for example.

An aspect of the present invention is directed to providing an image processing apparatus that is capable of reducing the time required for acquiring information from a medium to be scanned.

In the following, embodiments of the present invention are described with reference to the accompanying drawings.

First, an overall process of scanning a medium to acquire information from the medium and using the acquired information is described. In an embodiment of the present invention described below, a passport is illustrated as an example of a medium to be scanned, and a process of creating tax exemption documents entitled "Record of Purchase of Consumption Tax-Exempt for Export" and "Covenant of Purchase of Consumption Tax-Exempt for Ultimate Export" that are required for purchasing an item tax-free at a store is described as an example of using the acquired information. Note that in the following, the "Record of Purchase of Consumption Tax-Exempt for Export" and the "Covenant of Purchase of Consumption Tax-Exempt for Ultimate Export" may simply be referred to as tax exemption documents.

Typically, the sale of a tax-exempt item may involve the following steps.

1. A purchaser presents his/her passport to a store clerk upon purchasing the item.
2. The store clerk reads the information content of the passport to create a "Record of Purchase of Consumption Tax-Exempt for Export" and a "Covenant of Purchase of Consumption Tax-Exempt for Ultimate Export". The "Record of Purchase of Consumption Tax-Exempt for Export" is a document to be presented by the purchaser along with his/her passport at customs in order to get a tax exemption. The "Covenant of Purchase of Consumption Tax-Exempt for Ultimate Export" is a document to be kept by the store as a record indicating that the purchaser has purchased the item.
3. The purchaser signs the "Covenant of Purchase of Consumption Tax-Exempt for Ultimate Export" and submits this to the store.
4. In turn, the store clerk attaches the "Record of Purchase of Consumption Tax-Exempt for Export" to the purchaser's passport.
5. Then, the store clerk hands the item to the purchaser.

A multifunction peripheral (MFP) 100 according to an embodiment of the present invention is capable of improving efficiency in creating the above-described "Record of Purchase of Consumption Tax-Exempt for Export" and "Covenant of Purchase of Consumption Tax-Exempt for Ultimate Export" based on information indicated in a passport.

FIG. 1 is schematic diagram describing an overall operation in which the MFP 100 scans a medium to acquire information from the medium and outputs the acquired information. For example, the operation may be performed in the following manner.

(1) First, a store clerk or the like sets a passport 200 on a contact glass of the MFP 100 and presses a start button 623. As a result, the MFP 100 scans the passport 200.

(2) Then, the MFP 100 performs a character recognition process on the scanned image of the passport 200 to extract information necessary for creating the tax exemption documents. The MFP 100 displays the extracted information on a display that is used as an operation panel, and in this way, the store clerk can confirm whether the extracted information matches the information content indicated in the passport 200. The MFP 100 accepts edits made by the store clerk and input of information not included in the passport 200, for example.

(3) The MFP 100 sets up the information extracted from the passport 200 and the information input by the store clerk in a template for the "Record of Purchase of Consumption Tax-Exempt for Export" and the "Covenant of Purchase of Consumption Tax-Exempt for Ultimate Export" that is provided as an electronic document for creating the tax-exemption documents.

(4) Then, in response to accepting an operation by the store clerk, for example, the MFP 100 prints out the tax exemption documents that have been created. The tax exemption documents may be printed on one sheet of paper having a cut line separating these documents, and the store clerk may tear these documents apart, for example. In this way, the above-described step 2 for creating a "Record of Purchase of Consumption Tax-Exempt for Export" and a "Covenant of Purchase of Consumption Tax-Exempt for Ultimate Export" may be completed and the subsequent steps 3-5 may be carried out in the manner described above.

Upon scanning a medium such as the passport 200 as described above (1), the MFP 100 according to the present embodiment uses application software to implement processes as described below. That is, application software (document scan app 41a as described below) is run on the MFP 100 according to the present embodiment. The application software may be additionally installed or uninstalled in the MFP 100 after its shipment as described below. The document scan app 41a according to the present embodiment is an application program for supporting the execution of administrative tasks associated with the operation of a tax-free store.

Figure 2:
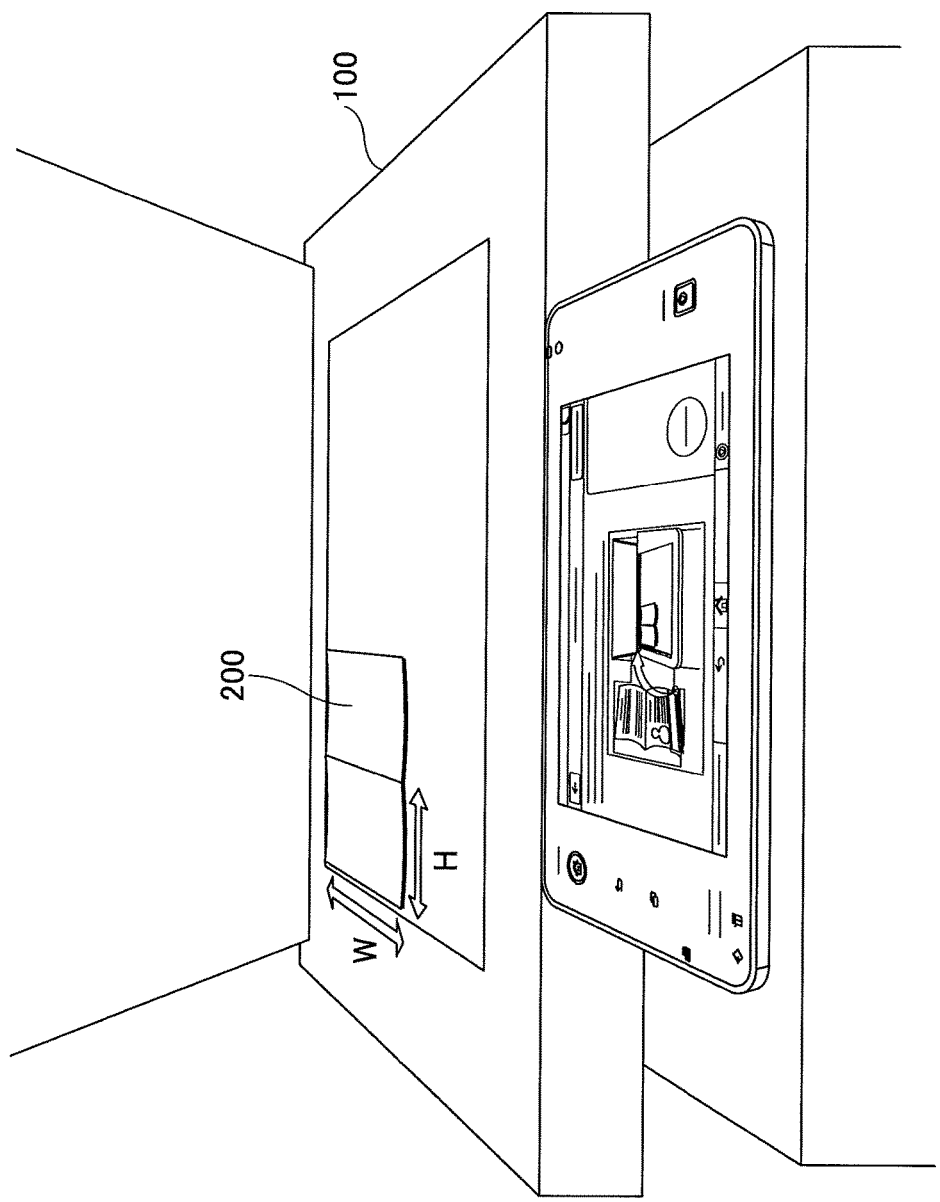
FIG. 2 is a diagram describing a scan area to be scanned by the multifunction peripheral.

FIG. 2 is a diagram describing a scan region to be scanned by the MFP 100 according to the present embodiment. In FIG. 2, the passport 200 is placed on the contact glass as described above. The passport 200 includes a region called "Machine Readable Zone" (hereinafter referred to as "MRZ"). The position of the MRZ and information content described in the MRZ are specified by international standards.

The document scan app 41a includes scan location information for scanning at least the MRZ. The document scan app 41a transmits the scan location information to a scan function of the MFP 100 such that a store clerk may be relieved of the trouble of having to input scan location information of the MRZ every time tax exemption documents have to be prepared, for example.

The current location of the MRZ is at the bottom of the passport 200. Therefore, the document scan app 41a transmits scan location information for scanning the lowermost portion of the passport 200 to the scan function of the MFP 100. The scan location information includes a scanning distance W in the main scanning direction and a scanning distance H in the sub scanning direction. Based on the scan location information, the MFP 100 scans the passport 200 across the distance W in the main scanning direction while moving a carriage (described below) across the distance H in the sub scanning direction. Note that after the carriage travels the distance H in the sub scanning direction, it returns to its original position.

Note that by specifying the scan location information as described above, the MFP 100 according to the present embodiment may reduce the traveling distance of the carriage to be shorter than a scanning distance in the sub scanning direction for scanning the entire passport 200 such that the scanning time can be reduced. Also, the MFP 100 according to the present embodiment may not have to perform a character recognition process on image data of the entire passport 200 but only on the MRZ such that character recognition processing time can be reduced. Also, characters recognized by the character recognition process may not include characters included in the entire passport 200 but only a relevant portion thereof such as those in the MRZ, and in this way, the time required to extract the characters necessary for document generation may be reduced. Also, the image data size of the scanned image and the time required for communication between the scan function of the MFP 100 and the document scan application 41a can be reduced.

<Terminology>

In the following descriptions, target information may refer to information to be scanned by a scanner in creating a document. Alternatively, target information may refer to information to be read by a machine and decoded or subjected to character recognition processing. Specific examples of target information include information described as a bar code, characters, numerals, and/or special symbols.

A medium including a scan region refers to a medium having a region where the target information is provided. The material and shape of the medium are not particularly limited as long as the target information provided therein can be acquired by a device such as a scanner. If the medium is a tangible object, the target information can be scanned and captured by a scanner, for example. Specific examples of such tangible media include paper, a document, plastic, resin, metal, fiber, and the like. In the present embodiment, the passport 200 is illustrated as an example of a medium including a scan region where the target information is provided. Other examples of such a medium include but are not limited to an individual number card (social security number card), a health insurance card, a driver's license, an employee ID card, and other pieces of personal identification.

An electronic document refers to a digital document including digital data and one or more input fields. Examples of electronic documents include but are not limited to legal documents prepared according to law, documents to be submitted to governmental agencies, documents to be submitted to companies, documents for home use, documents to be stored, and the like. Further, the electronic document may be printed out or used as is in its electronic form.

Specific examples of electronic documents include but are not limited to tax payment documents, such as a final return form, registration documents, contracts, resumes, and the like. In the present embodiment, an electronic document including a "Record of Purchase of Consumption Tax-Exempt for Export" and a "Covenant of Purchase of Consumption Tax-Exempt for Ultimate Export" is described as an example.

Also, note that in the present embodiment, it is assumed that a store clerk operates the MFP 100. However, a user that operates that MFP 100 may also be a traveler or a purchaser, for example. That is, the MFP 100 may be operated by various users/operators.

<Overall Configuration>

Figure 3:
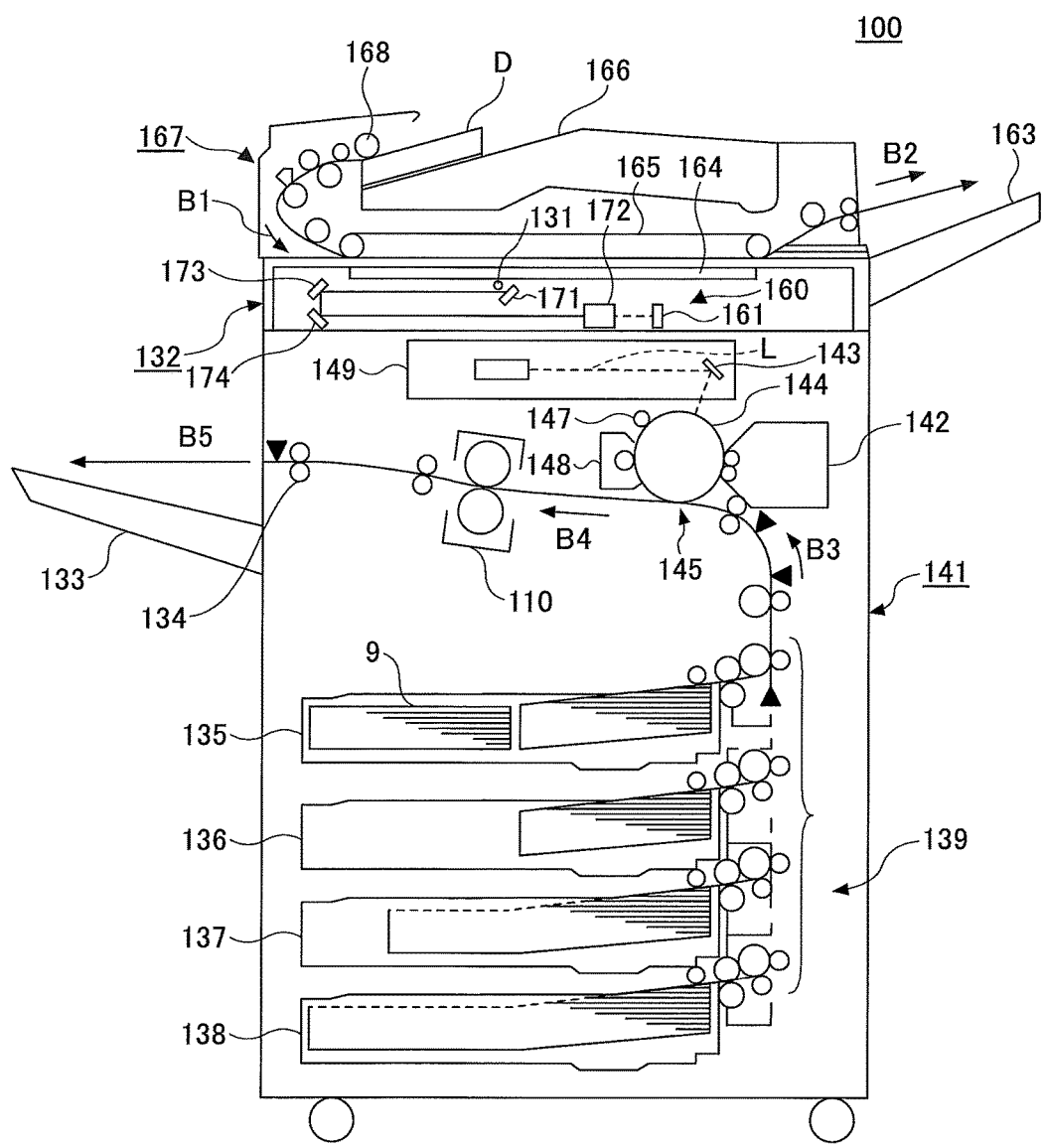
FIG. 3 is a schematic longitudinal front view of the multifunction peripheral.

FIG. 3 is a longitudinal front view of the MFP 100 according to the present embodiment. The MFP 100 is an image processing apparatus including a plurality of functions. The MFP 100 may also be referred to as a copier, a printer, a scanner, an image forming apparatus, or an image processing apparatus, for example. The MFP 100 according to the present embodiment includes at least a scan function and a print function. In addition, the MFP 100 may include a facsimile function, a copy function, a data storage function, and the like. Further, the scan function and the print function of the MFP 100 do not necessarily have to be provided within a single housing of a single apparatus but may be separately provided as a scanner apparatus and a printer apparatus, for example. In this case, the scanner apparatus and the printer apparatus are preferably capable of communicating with each other wirelessly or through a wire, or an information processing apparatus is preferably provided that can communicate with the scanner apparatus and the printer apparatus.

The configuration of the MFP 100 is largely divided into a scan unit 132 for scanning a document, an image forming unit 141 for forming an image, an automatic document feeder (ADF) 167, a document discharge tray 163 for stacking documents loaded into and discharged by the ADF 167, a paper feed unit 139 including a plurality of paper feed cassettes 135 to 138, and a paper discharge unit (paper discharge tray) 133 for stacking recorded paper.

For example, a user such as a store clerk may open the ADF 167, place a document D (passport 200 in the present embodiment) on a contact glass 164, and press a start button. In turn, the MFP 100 determines the document size based on scan location information or by automatically detecting the size of the document D, for example. The scan unit 132 includes an exposure lamp 131 for illuminating the document D on the contact glass 164, and an optical system 160 for forming an image of the document, for example. The optical system 160 includes a first mirror 171, a lens 172, a second mirror 173, a third mirror 174, and a charge-coupled device (CCD) 161 as a linear image sensor for forming a document image, for example. The exposure lamp 131 and the first mirror 171 are fixed to a first carriage, and the second mirror 173 and the third mirror 174 are fixed to a second carriage. When the first carriage moves in the sub scanning direction to scan the document D, the first carriage and the second carriage are mechanically run at relative speeds of 2 to 1, respectively, so that the optical path length to the CCD does not change. In the present embodiment, the amount of movement of the first carriage and the second carriage is controlled by the scan location information. Hereinafter, the first carriage and the second carriage may simply be referred to as "carriage" when they do not have to be distinguished from one another.

Note that in the case where the ADF 167 is used, the uppermost document D stacked on a loading tray 166 may be loaded into the ADF 167 when the store clerk presses the start button, for example. The document D is carried in the direction of arrow B1 by the rotation of a pickup roller 168 and conveyed onto the contact glass 164 by the rotation of a document conveying belt 165 where it is stopped. Then, the scan unit 132 located between the image forming unit 141 and the contact glass 164 may scan the document D placed on the contact glass 164, for example.

An image processing unit of the scan unit 132 uses the CCD 161 to photoelectrically convert light that has been illuminated on the document D by the exposure lamp 131 and reflected by the document D to generate analog data. The analog data is converted into digital image data by an analog-to-digital (A/D) converter. The digitally converted image data may be further subjected to shading correction, modulation transfer function (MTF) correction, and gamma (γ) correction, for example. The image data (digital data) that have been subjected to these processes may then be temporarily stored in a memory.

A photoreceptor 144 corresponding to an image carrier is arranged inside the image forming unit 141. The photoreceptor 144 is rotationally driven in the clockwise direction in FIG. 3 and its surface is charged to a predetermined potential by a charging device 147. Also, a write unit 149 irradiates laser light L that has been modulated based on image information captured and read by the scan unit 132 and polarizes the modulated laser light L with a polygon mirror that rotates at high speed. The polarized laser light L passes through an imaging lens and is reflected by a mirror 143 so as to be irradiated on the photoreceptor 144.

The charged surface of the photoreceptor 144 is exposed to the laser beam L modulated by the image information, line-by-line, so that an electrostatic latent image is formed on the surface of the photoreceptor 144. The electrostatic latent image is developed by toner being attracted to the surface of the photoreceptor 144 when it passes through a developing device 142, and a transfer device 145 arranged opposite that photo receptor 144 causes the developed toner image to be transferred onto a recording material 9 that is fed between the photoreceptor 144 and the transfer device 145. After the toner image is transferred, the surface of the photoreceptor 144 is cleaned by a cleaning device 148.

The plurality of paper feed cassettes 135 to 138 arranged at the bottom of the image forming unit 141 accommodate recording material 9 such as paper and the recording material 9 accommodated in one of the paper feed cassettes 135 to 138 is carried in the direction of arrow B3 such that the toner image formed on the surface of the photoreceptor 144 is transferred onto the surface of the recording material 9 as described above.

Then, the recording material 9 is conveyed in the direction of arrow B4 to pass through a fixing device 110 arranged in the image forming unit 141 such that the toner image transferred onto the surface of the recording material 9 is fixed by heat and pressure. The recording material 9 having passed through the fixing device 110 is conveyed in the direction of arrow B5 by a pair of discharge rollers 134 to be discharged to a discharge tray 133 and stacked thereon.

Note that although the MFP 100 illustrated in FIG. 3 is configured to form an image by the electrophotographic method, the MFP 100 may also be configured to form an image using an inkjet method, a thermal transfer method, and the like.

<Hardware Configuration>

Figure 4A:
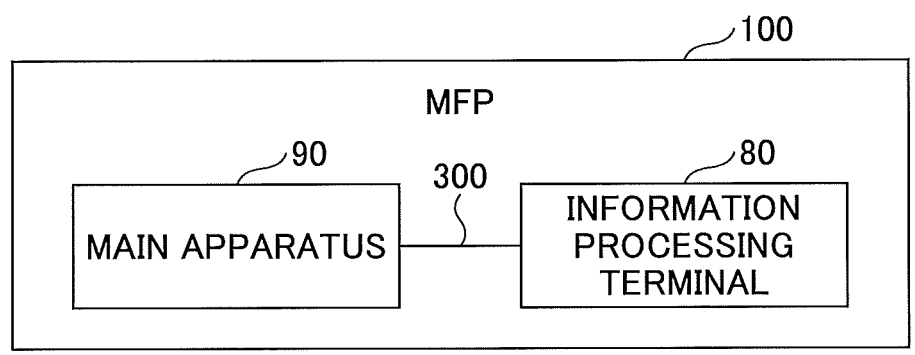
FIGS. 4A and 4B are block diagram illustrating an example hardware configuration of the multifunction peripheral.

FIG. 4A is a diagram schematically illustrating an example hardware configuration of the MFP 100. In FIG. 4A, the MFP 100 includes a main apparatus 90 and an information processing terminal 80 that are connected by a communication path 300 to be able to communication with each other. Communication between the main apparatus 90 and the information processing terminal 80 may be established by a USB (Universal Serial Bus), short-range wireless communication (e.g., Bluetooth (registered trademark) or infrared transmission), or a LAN (wired or wireless), for example.

The main apparatus 90 includes at least a scan function for scanning a document and a print function. The information processing terminal 80 is configured to run an application program to display a screen that serves as an interface with a user such as a store clerk, for example.

The information processing terminal 80 may be an electronic device, such as a smartphone or a tablet terminal, capable of independently executing complete information processing. In the present embodiment, the information processing terminal 80 functions as an operation unit of the main apparatus 90. More specifically, the information processing terminal 80 is connected to the main apparatus 90 to function as an operation panel that is typically provided as an operation unit dedicated to the MFP 100. The information processing terminal 80 and the main apparatus 90 may be regarded as one single apparatus or separate apparatuses.

Further, the information processing terminal 80 may or may not be removable from the MFP 100.

Figure 4B:
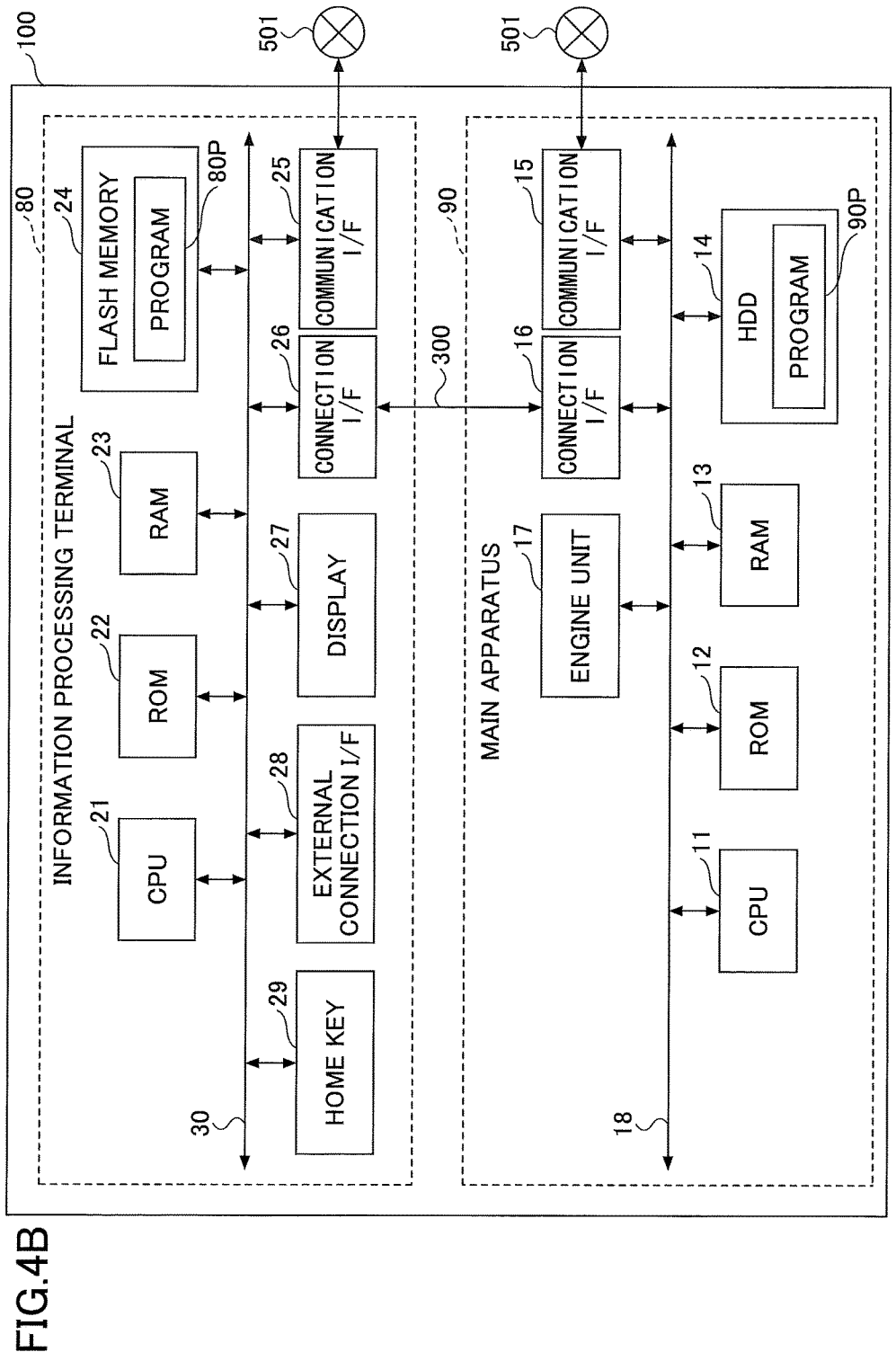

In the following, the hardware configuration of the MFP 100 will be described in detail with reference to FIG. 4B. FIG. 4B illustrates an example hardware configuration of the MFP 100. The main apparatus 90 and the information processing terminal 80 of the MFP 100 are connected to each other by the communication path 300 so that they may communicate with each other.

The main apparatus 90 is capable of implementing a process in response to an operation accepted by the information processing terminal 80. Further, the main apparatus 90 is capable of communicating with an external device such as a client PC (personal computer) and implementing a process based on an instruction received from the external device, for example.

The main apparatus 90 includes a CPU 11, a ROM 12, a RAM 13, an HDD (hard disk drive) 14, a communication I/F (interface) 15, a connection I/F 16, and an engine unit 17 that are connected to each other via a system bus 18.

The CPU 11 controls overall operations of the main apparatus 90. The CPU 11 may control the overall operations of the main apparatus 90 by loading a program 90P stored in the ROM 12 or the HDD 14 in the RAM 13 that is used as a work area and executing the program 90P to control the engine unit 17, for example. The CPU 11 may also implement various functions, such as a copy function, a scan function, a facsimile function, and a print function, for example.

The communication I/F 15 is an interface for establishing connection with a network 501. The connection I/F 16 is an interface for establishing communication with the information processing terminal 80 via the communication path 300.

The engine unit 17 is hardware for implementing general-purpose information processing functions, such as a copy function, a scan function, a facsimile function, and a print function and processes other than communication. For example, engine unit 17 may include a scanner (scanning device) for implementing a scan function, a plotter (printing device) for implementing a print function, and a facsimile device for implementing facsimile communication. Further, the engine unit 17 may include optional hardware, such as a finisher for sorting sheets of printed material and an ADF (automatic document feeder) for automatically feeding documents to be scanned.

The information processing terminal 80 includes a CPU 21, a ROM 22, a RAM 23, a flash memory 24, a communication I/F 25, a connection I/F 26, a display 27, an external connection I/F 28, and a home key 29 that are connected to each other via a system bus 30.

The CPU 21 controls overall operations of the information processing terminal 80. The CPU 21 may control the overall operations of the information processing terminal 80 by loading a program 80P stored in the ROM 22 or the flash memory 24 in the RAM 23 that is used as a work area and executing the program 80P, for example. In this way, the CPU 21 may implement various functions, such as the display of image data based on an input by a user, for example.

The communication I/F 25 is an interface for establishing connection with the network 501. The connection I/F 26 is an interface for communicating with the main apparatus 90 via the communication path 300.

The display 27 accepts various inputs according to operations made by a user and displays various types of information (e.g., information corresponding to the accepted operation, information indicating the operation status of the MFP 100, information indicating current settings) on a screen. The display 27 may be implemented by a liquid crystal display (LCD) equipped with a touch panel function, for example, but it is not limited thereto. The display 27 may also be implemented by an organic EL display device equipped with a touch panel function, for example. Also, the information processing terminal 80 may include a hardware key, a lamp, and other hardware elements in addition to the display 27. For example, the information processing terminal 80 may include a hardware key called "home key 29" that can be pressed by a user such as a store clerk to display a list of available applications. Note that the home key 29 may also be implemented as a software key displayed on the screen, for example.

The external connection I/F 28 is an interface for establishing communication with an external device and may be connected to an IC card reader/writer, for example.

The home key 29 is a key to be operated (pressed) by the user for inputting an event of selecting the home key to the information processing terminal 80. Note that in the example configuration of FIG. 4B, the home key 29 is implemented by a hardware key, but the home key 29 may also be implemented by a software key, for example.

In the following, the software configuration of the MFP 100 is described with reference to FIG. 5. FIG. 5 is a schematic diagram illustrating an example software configuration of the MFP 100. The main apparatus 90 includes an application layer 101, a service layer 102, and an operating system (OS) layer 103. The application layer 101, the service layer 102, and the OS layer 103 are implemented by various types of software stored in the ROM 12 or the HDD 14, for example. The CPU 11 executes such software to implement various functions.

The application layer 101 is implemented by application software (also referred to as "app") that is run on the information processing terminal 80 to cause relevant hardware resources of the main apparatus 90 to provide predetermined functions. For example, application software implementing the application layer 101 may include a copy app for providing a copy function, a scan app for providing a scan function, a facsimile app for providing a facsimile function, and a print app for providing a print function.

The service layer 102 is interposed between the application layer 101 and the OS layer 103 and is implemented by software for providing an application with an interface for using the hardware resources of the main apparatus 90. More specifically, software implementing the service layer 102 may include software for providing functions of accepting operation requests to hardware resources and arbitrating the operation requests. Examples of operation requests that may be accepted by the service layer 102 may include a scan request for a scanner to perform a scanning operation, a print request for a plotter to perform a printing operation, and the like.

Note that the service layer 102 provides interface functions not only to the application layer 101 of the main apparatus 90 but also to an application layer 201 of the information processing terminal 80. That is, an application of the application layer 201 of the information processing terminal 80 may implement a predetermined function by using one or more hardware resources (e.g., the engine unit 17) of the main apparatus 90 via the interface function of the service layer 102.

The OS layer 103 is implemented by basic software (operating system) for providing basic functions for controlling the hardware resources of the main apparatus 90. Software implementing the service layer 102 converts requests for the use of hardware resources of the main apparatus 90 from various applications into commands interpretable by the OS layer 103 and passes the converted requests to the OS layer 103. In this way, software implementing the OS layer 103 may execute the commands to thereby cause relevant hardware resources to perform operations according to the requests from the applications.

The information processing terminal 80 similarly includes an application layer 201, a service layer 202, and an OS layer 203. The hierarchical structure of the information processing terminal 80 including the application layer 201, the service layer 202, and the OS layer 203 is substantially similar to that of the main apparatus 90. However, the functions provided by the applications of the application layer 201 and the types of operation requests that can be accepted by the service layer 202 are different from those of the main apparatus 90. The applications of the application layer 201 are mainly software for providing user interface functions of displaying and accepting operations relating to the functions of the main apparatus 90 (e.g., copy function, scan function, facsimile function, print function). Note that the application layer 201 may also include application software for operating a hardware resource of the information processing terminal 80 to provide a predetermined function.

Also, in the present embodiment, software implementing the OS layer 103 of the main apparatus 90 and software implementing the OS layer 203 of the information processing terminal 80 are different from each other. That is, the main apparatus 90 and the information processing terminal 80 operate independently from each other based on different operating systems. For example, Linux (registered trademark) may be used as software implementing the OS layer 103 of the main apparatus 90 and Android (registered trademark) may be used as software implementing the OS layer 203 of the information processing terminal 80. Note, however, that in some embodiments, the main apparatus 90 and the information processing terminal 80 may be operated by the same OS, for example.

As described above, in the MFP 100 according to the present embodiment, the main apparatus 90 and the information processing terminal 80 are operated by different operating systems, and as such, communication between the main apparatus 90 and the information processing terminal 80 may not be regarded as inter-process communication within a common apparatus but as communication between different apparatuses. Examples of communication between the main apparatus 90 and the information processing terminal 80 include the information processing terminal 80 transmitting information (e.g., command from a user) accepted by the information processing terminal 80 to the main apparatus 90 (command communication) and the main apparatus 90 notifying the information processing terminal 80 of information such as an event, for example. Note that the information processing terminal 80 may be able to use a function of the main apparatus 90 by conveying a command to the information processing terminal 80 as described above, for example. Also, the information conveyed from the main apparatus 90 to the information processing terminal 80 may include the execution status of an operation executed in the main apparatus 90 and/or settings implemented in the main apparatus 90, for example.

Also, note that power is supplied to the information processing terminal 80 from the main apparatus 90 via the communication path 300, and as such, power supply control of the information processing terminal 80 may be implemented separately (independently) from power supply control of the main apparatus 90, for example.

<Functional Configuration of MFP 100>

Figure 6:
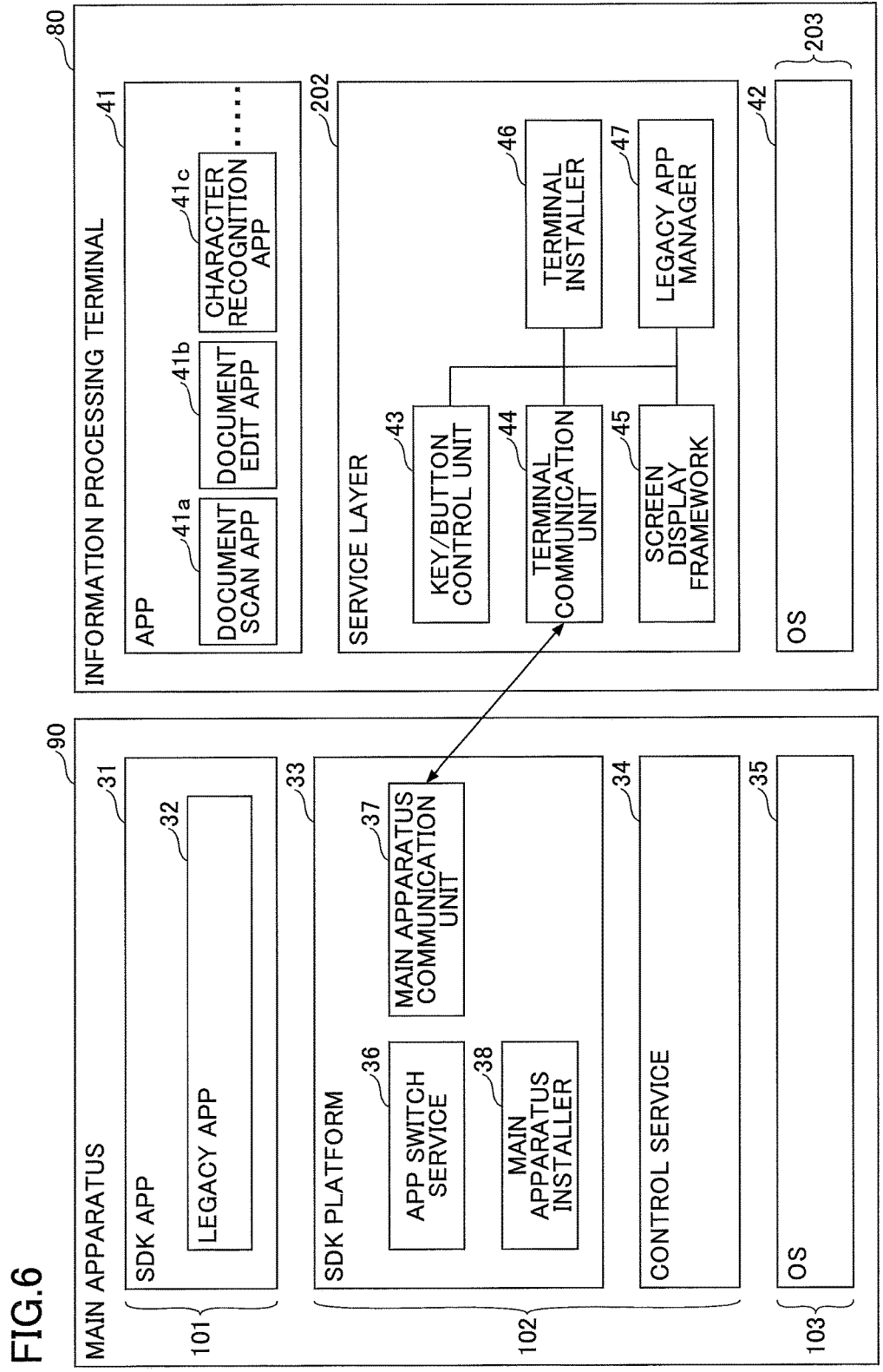
FIG. 6 is a block diagram illustrating an example functional configuration of the multifunction peripheral.

In the following, the functional configuration of the MFP 100 is described with reference to FIG. 6. FIG. 6 is a block diagram illustrating an example functional configuration of the MFP 100. Note that for convenience of explanation, FIG. 6 illustrates example functions of the MFP 100 relevant to the present embodiment. However, functions of the MFP 100 are not limited thereto.

The main apparatus 90 includes an OS 35, a control service 34, a service development kit (SDK) platform 33, and an SDK app 31.

The OS 35 is an OS for implementing the OS layer 103. Each application run on the main apparatus 90 is implemented as a process or a thread on the OS 35.

The control service 34 is software for implementing the service layer 102. Specifically, the control service 34 is implemented by a software module group that includes functions of controlling various hardware resources and provides an interface for enabling an upper layer application to use these functions.

For example, the control service 34 may include a function related to network communication, a scanner control function, a printer control function, memory management functions for managing the RAM 13, the ROM 12, and the HDD 14.

The SDK platform 33 includes an API (Application Program Interface) for developing the SDK application 31 and provides an execution environment for the SDK application 31. The API may include functions or class methods and instances of an object-oriented program, for example.

Note that the SDK platform 33 may include Java (registered trademark) VM (Virtual Machine), for example. In this case, the SDK application 31 is implemented in Java (registered trademark) language.

The SDK app 31 is an application that runs on the SDK platform 33 and is specifically referred to as a legacy app 32. Note that the term "legacy" is not to be construed to limit the functions and/or purpose of the of the legacy app 32 but is merely used for the sake of convenience as a relative expression with respect to an app 41 operating on the information processing terminal 80.

In FIG. 6, the legacy app 32 as the SDK app 31 is installed in the main apparatus 90. However, a program that can be installed in the main apparatus 90 is not limited thereto. That is, the SDK app 31 may be an application (also referred to as a "plug-in") that is additionally installed in the main apparatus 90 in order to extend the functions of the main apparatus 90 after its shipment.

The SDK platform 33 includes an app switch service 36, a main apparatus communication unit 37, and a main apparatus installer 38. The app switch service 36 activates the legacy app 32. Also, the app switch service 36 receives a change request from the SDK application 31 for changing the display status of a display component and transmits the received change request to the control service 34. That is, the app switch service 36 executes a process for controlling the information processing terminal 80 to reflect a change in the display status of a display component in response to a display control request directed to an operation panel. For example, the app switch service 36 may receive from the SDK application 31 a change request for changing the display status of a display component and transmit the received change request to the information processing terminal 80 via the main apparatus communication unit 37. In this way, display control by the SDK application 31 can be implemented in cooperation with or in synch with display control by the app 41 run on the information processing terminal 80.

Note that a display component refers to a component to be displayed on a screen. For example, a display component for causing the main apparatus 90 to execute a certain process (job) may be displayed. Examples of display components include a button, a software key, a soft keyboard, a window, a label displaying a character string, and the like.

The main apparatus communication unit 37 controls communication with the information processing terminal 80. The main apparatus communication unit 37 may communicate with the information processing terminal 80 using HTTP (HyperText Transfer Protocol), for example. However, the communication protocol used to establish communication between the main apparatus 90 and the information processing terminal 80 is not limited to HTTP.

The main apparatus installer 38 installs various applications including the legacy app 32 in the main apparatus 90. The legacy app 32 installed by the main apparatus installer 38 is registered in the app switch service 36 and the information processing terminal 80 is notified of the installation.

Note that the above-described functions of the main apparatus 90 may be implemented by the CPU 11 executing the program 90P that is loaded in the RAM 13 from the HDD 14, for example. However, the present invention is not limited thereto, and in some embodiments, at least a part of the above-described functions of the main apparatus 90 may be implemented by a dedicated hardware circuit (e.g., semiconductor integrated circuit).

The information processing terminal 80 includes one or more apps 41 implementing the the application layer 201. The apps 41 include a document scan app 41a, a document edit app 41b, and a character recognition app 41c. The document scan app 41a is an application for optically scanning a document using the scan function of the main apparatus 90. The document edit app 41b is an application for performing various types of image processing on the scanned image, and the character recognition app 41c is an application for recognizing characters from image data and converting the recognized characters into text data. Note that other types of applications may be included in the apps 41.

Note that in some embodiments, the document edit app 41b and/or the character recognition application 41c may be integrated with the document scan app 41a, for example. Also, in some embodiments, the document edit app 41b and/or the character recognition app 41c may be installed in the main apparatus 90 as the SDK app 31. Further, in some embodiments, the functions of the document scan app 41a, the document edit app 41b, and the character recognition app 41c may be implemented by one application, for example.

In the present embodiment, the character recognition app 41c is installed in the information processing terminal 80, and as such, when character recognition technology is improved, for example, updating the character recognition app 41c may be easier as compared with the case where the character recognition app 41c is installed in the main apparatus 90 of the MFP 100, for example. Also, by installing the character recognition app 41c in the information processing terminal 80, the character recognition app 41c may be more easily adapted to improve accuracy in recognizing characters included in the MRZ of the passport 200, or improve integration with the document scan app 41a, for example.

Also, the service layer 202 of the information processing terminal 80 may include a key/button control unit 43, a terminal communication unit 44, a screen display framework 45, a terminal installer 46, and a legacy app manager 47. Note that the arrangement of the above functions of the information processing terminal 80 in FIG. 6 is an example schematic illustration for convenience of explanation and the arrangement of these functions is not limited to that of FIG. 6. Also, although the above functions are included in the service layer 202 in FIG. 6, some of the above functions may be included in the OS layer 203 or the application layer 201, for example.

In the case where the home key 29 is implemented by a hardware key, the key/button control unit 43 detects when the home key 29 is pressed by a user. In the case where the home key 29 is implemented by a software key, the key/button control unit 43 controls the display 27 to display the home key 29 as a display component and detects when the home key 29 is pressed by the user. The key/button control unit 43 may also accept other operations on the information processing terminal 80, for example.

The terminal communication unit 44 communicates with the main apparatus communication unit 37 of the main apparatus 90. In this way, the information processing terminal 80 may transmit a request for starting the legacy app 32, and information indicating a hardware key or a software key that has been pressed, for example, to the main apparatus 90.

The screen display framework 45 is a framework for displaying a screen on the display 27. The screen display framework 45 may control the display 27 to display a list of icons that can be operated and screens generated by the apps 41, for example. Note that a framework refers to a group of standard classes for implementing a specific process. By using a framework, development time may be reduced, for example. However, a framework is merely a group of programs and a screen may also be displayed without using a framework.

The terminal installer 46 manages the installation/uninstallation of the apps 41 in the information processing terminal 80. For example, when the document scan app 41a is installed in the information processing terminal 80, the terminal installer 46 notifies the key/button control unit 43 and the screen display framework 45 that the document scan app 41a has been newly installed so that the document scan app 41a may be run on the information processing terminal 80.

The legacy app manager 47 manages information on the legacy app 32 installed in the main apparatus 90 and performs control operations, such as notifying the screen display framework 45 of the status of the legacy app 32 based on notification received from the main apparatus 90. Note that information on the legacy app 32 managed by the legacy app manager 47 may include the name of the legacy app 32, a corresponding icon for the legacy app 32, the version of the legacy app 32, and the installation date/time of the legacy app 32, for example.

Note that the OS 42 provides an execution environment for the service layer 202 and the app 41 to operate. The OS 42 may start and terminate the apps 41, perform memory management, and enable communication between apps, for example.

Further, at least one of the main apparatus 90 and the information processing terminal 80 is provided with a function for authenticating the user such as a store clerk. Such an authentication function may prevent the store clerk from using the MFP 100 unless the user properly logs in, for example. Such an authentication function may be turned on/off by an administrator of the MFP 100, for example. By authenticating the store clerk, the MFP 100 may be able to acquire an attribute (e.g. name) of the store clerk, for example.

Figure 7:
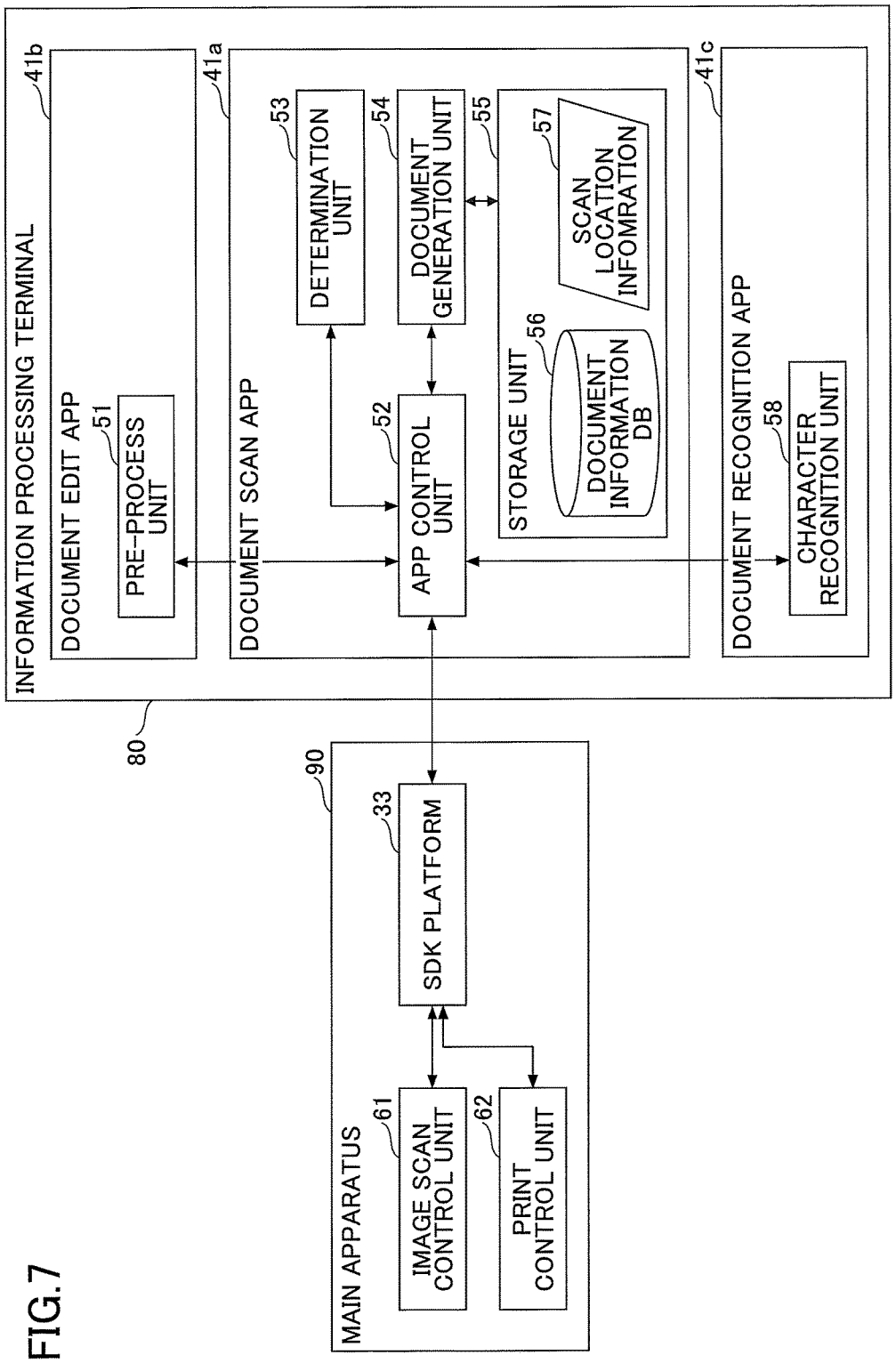
FIG. 7 is block diagram illustrating an example functional configuration of the multifunction peripheral for implementing functions relating to character recognition.

FIG. 7 is a block diagram illustrating an example functional configuration of the MFP 100 for implementing functions relating to character recognition. Note that in FIG. 7, illustrations of functional units relating to communication, i.e., the main apparatus communication unit 37 of the main apparatus 90 and the terminal communication unit 44 of the information processing terminal 80, are omitted.

The main apparatus 90 includes an image scan control unit 61 and a print control unit 62 in addition to the SDK platform 33. The image scan control unit 61 may be implemented by a command from the CPU 11 and a scanner of the engine unit 17 of FIG. 4, for example. The image scan control unit 61 optically scans a document placed on the contact glass of the MFP 100 and generates image data of the document. The image scan control unit 61 may be included in the control service 34 of FIG. 6, for example, but may be included elsewhere in the main apparatus 90.

The print control unit 62 may be implemented by a command from the CPU 11 and a plotter of the engine unit 17 of FIG. 4, for example. The print control unit 62 controls the printing of image data on a sheet material such as paper. The print control unit 62 may be included in the control service 34 of FIG. 6, for example, but may be included elsewhere in the main apparatus 90.

Also, in FIG. 7, the document edit app 41b includes a pre-process unit 51. The pre-process unit 51 may be implemented by a command from the CPU 21 of FIG. 4, for example. The pre-process unit 51 executes a pre-process before executing a character recognition process on image data of the passport 200 scanned by the image scan control unit 61. For example, the pre-process may include the following process operations. Because the MRZ of the passport 200 is scanned when the carriage is moved forward, image data of the scanned characters of the MRZ may be upside down. Therefore, the pre-process unit 51 rotates the image data of the scanned characters by 180 degrees. Also, tilt correction may be performed as necessary. Then, a binarization process may be performed to remove noise and/or sharpen the edges of the scanned characters, for example. Then, the positions of the characters may be determined and the range of the MRZ including two rows of character strings may be acquired. Note that the pre-process is described in detail below with reference to FIGS. 10A-11B.

The character recognition app 41c includes a character recognition unit 58. The character recognition unit 58 may be implemented by a command from the CPU 21 of FIG. 4, for example. The character recognition unit 58 executes a character recognition process on the image data of the passport 200 that has been subjected to the pre-process by the pre-process unit 51.

The document scan app 41a include's a storage unit 55, which stores a document information DB (database) 56 and scan location information 57. The storage unit 55 may be implemented by at least one of the flash memory 24, the RAM 23, and the ROM 22 of FIG. 4, for example. The document information DB 56 stores a template for the "Record of Purchase of Consumption Tax-Exempt for Export" and the "Covenant of Purchase of Consumption Tax-Exempt for Ultimate Export". Note that the template for the "Record of Purchase of Consumption Tax-Exempt for Export" and the "Covenant of Purchase of Consumption Tax-Exempt for Ultimate Export" is an example of an electronic document including one or more input fields.

The scan location information 57 may include location information of the MRZ. For example, the scan location information 57 may include information indicating that the MRZ extends a certain distance [mm] in the main scanning direction and a certain distance [mm] in the sub-scanning direction. That is, the scan location information 57 also indicates a scan size for scanning the MRZ. Specifically, the scan location information 57 may include information indicating that the MRZ is 125 [mm] in the main scanning direction and 20 [mm] in the sub scanning direction. Note that the scan location information 57 may be preset in the document scan app 41a before the document scan app 41a is installed in the information processing terminal 80 or after the document scan app 41a is installed in the information processing terminal 80, for example. Alternatively, the information processing terminal 80 may acquire the scan location information 57 by communicating with a server, for example.

Because the document scan app 41a includes the scan location information 57, a provider of the document scan app 41a may freely change the location information of the MRZ by changing the scan location information 57 of the document scan app 41a. Also, the location information of the MRZ may be changed by installing an upgraded version of the document scan app 41a in the MFP 100, for example. Further, a store clerk may be able to input the scan location information 57, and in this case, the location information of the MRZ can be freely changed at a store, for example.

The document scan app 41a includes an app control unit 52, a determination unit 53, and a document generation unit 54. The app control unit 52 may be implemented by a command from the CPU 21 of FIG. 4, for example. The app control unit 52 performs overall control of operations for supporting the creation of documents at a tax-free store. The determination unit 53 may be implemented by a command from the CPU 21 of FIG. 4, for example, and determines whether a total amount of purchase of general goods exceeds 1 million yen. Note that process operations to be implemented based on such determination are in detail described below.

The document generation unit 54 may be implemented by a command from the CPU 21 of FIG. 4, for example. The document generation unit 54 creates tax exemption documents including a "Record of Purchase of Consumption Tax-Exempt for Export" and a "Covenant of Purchase of Consumption Tax-Exempt for Ultimate Export" by setting up the characters recognized by the character recognition process unit 58 in the template for the "Record of Purchase of Consumption Tax-Exempt for Export" and the "Covenant of Purchase of Consumption Tax-Exempt for Ultimate Export" stored in the document information DB 56 of the storage unit 55.

Note that the above-described functions of the information processing terminal 80 may be implemented by the CPU 21 loading the program 80P stored in the flash memory 24 in the RAM 23 and executing the program 80P.

<MRZ Region>

Figure 8A:
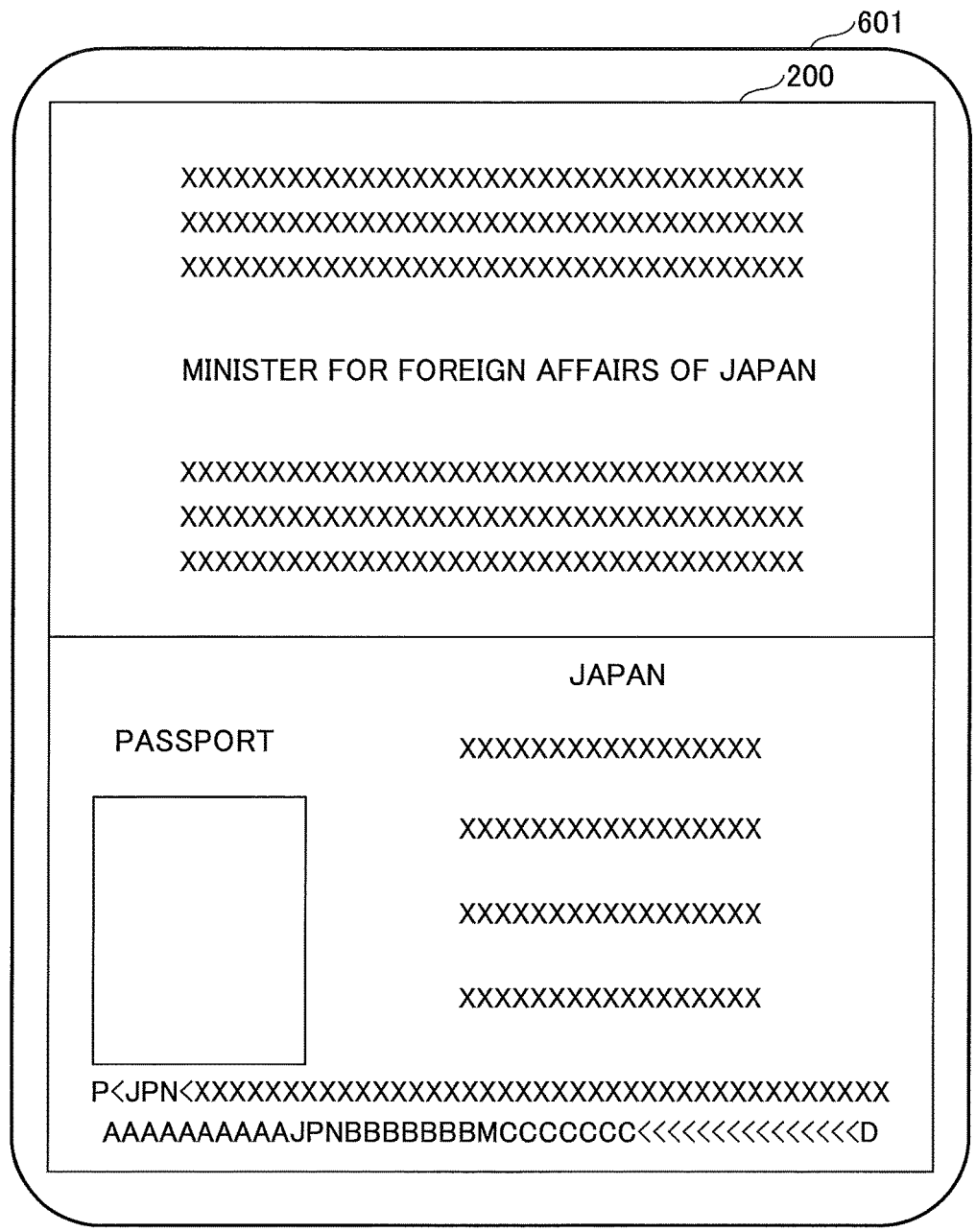
FIGS. 8A and 8B are diagram describing a machine readable zone of a passport.

FIG. 8A is a diagram schematically illustrating an example format of the passport 200 that is issued by the Japanese government. Note that the format of the passport 200 varies from country to country. However, the position of an MRZ region 70 (FIG. 8B) including the MZR and the information content provided in the MRZ region 70 are specified by international standards. Note that a typical scanner would scan an entire face 601 of the passport 200 as illustrated in FIG. 8A. On the other hand, the MFP 100 according to the present embodiment primarily scans the MRZ region 70 specified by the scan location information 57.

Figure 8B:
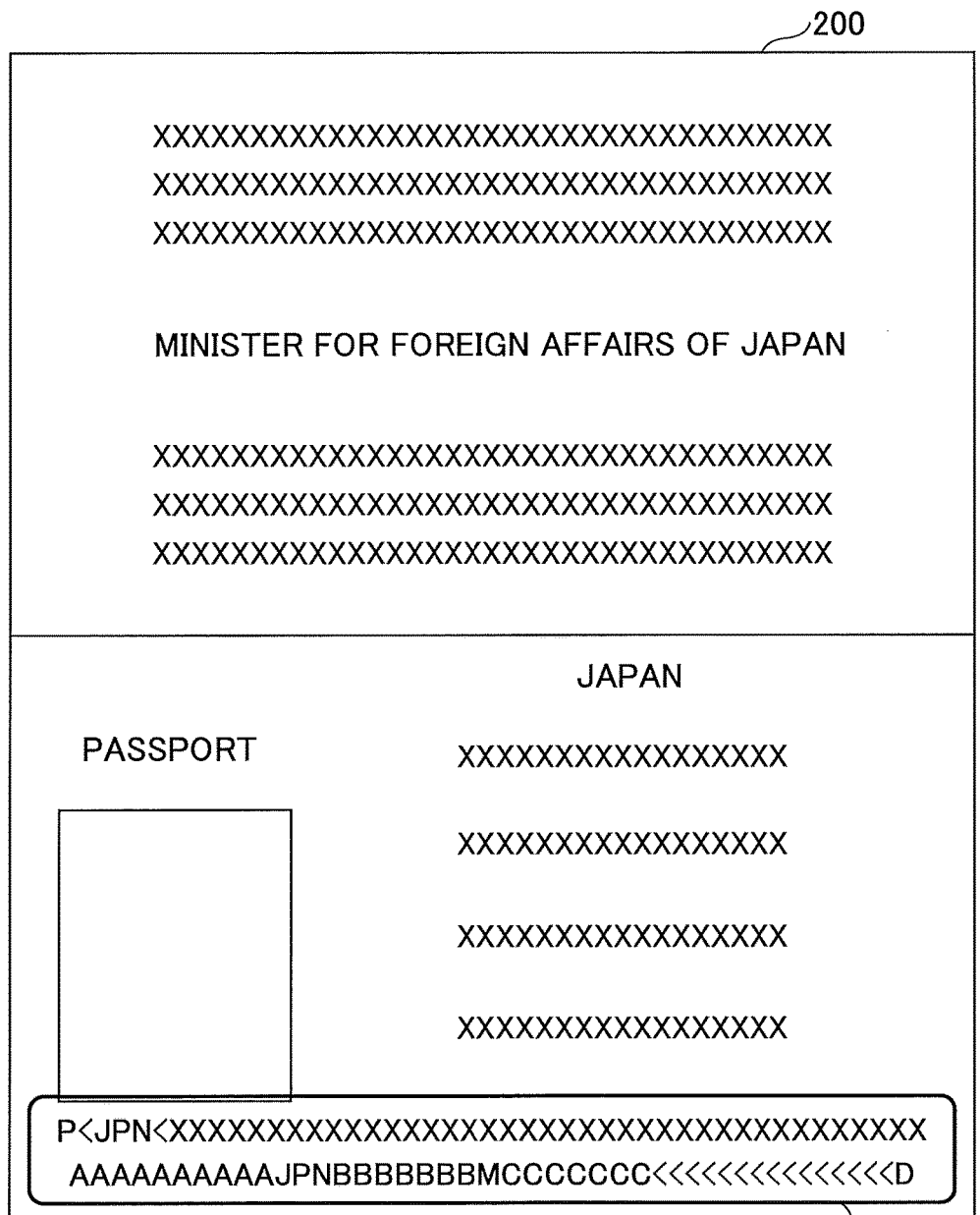

FIG. 8B is a diagram illustrating an example of the MRZ region 70 of the passport 200 to be scanned by the MFP 100. The MFP 100 according to the present embodiment may be configured to only scan the MRZ region 70, scan a region at least including the MRZ region 70, scan a region slightly larger than the MRZ region 70, or scan a region at least smaller than the entire face 610 of the passport 200. In this way, the scanning time, the character recognition processing time, the time required for extracting characters necessary for creating the tax exemption documents, and the time required for transmission/reception of information between the information processing terminal 80 and the main apparatus 90 may be reduced.

<Operation Procedure>

Figure 9:
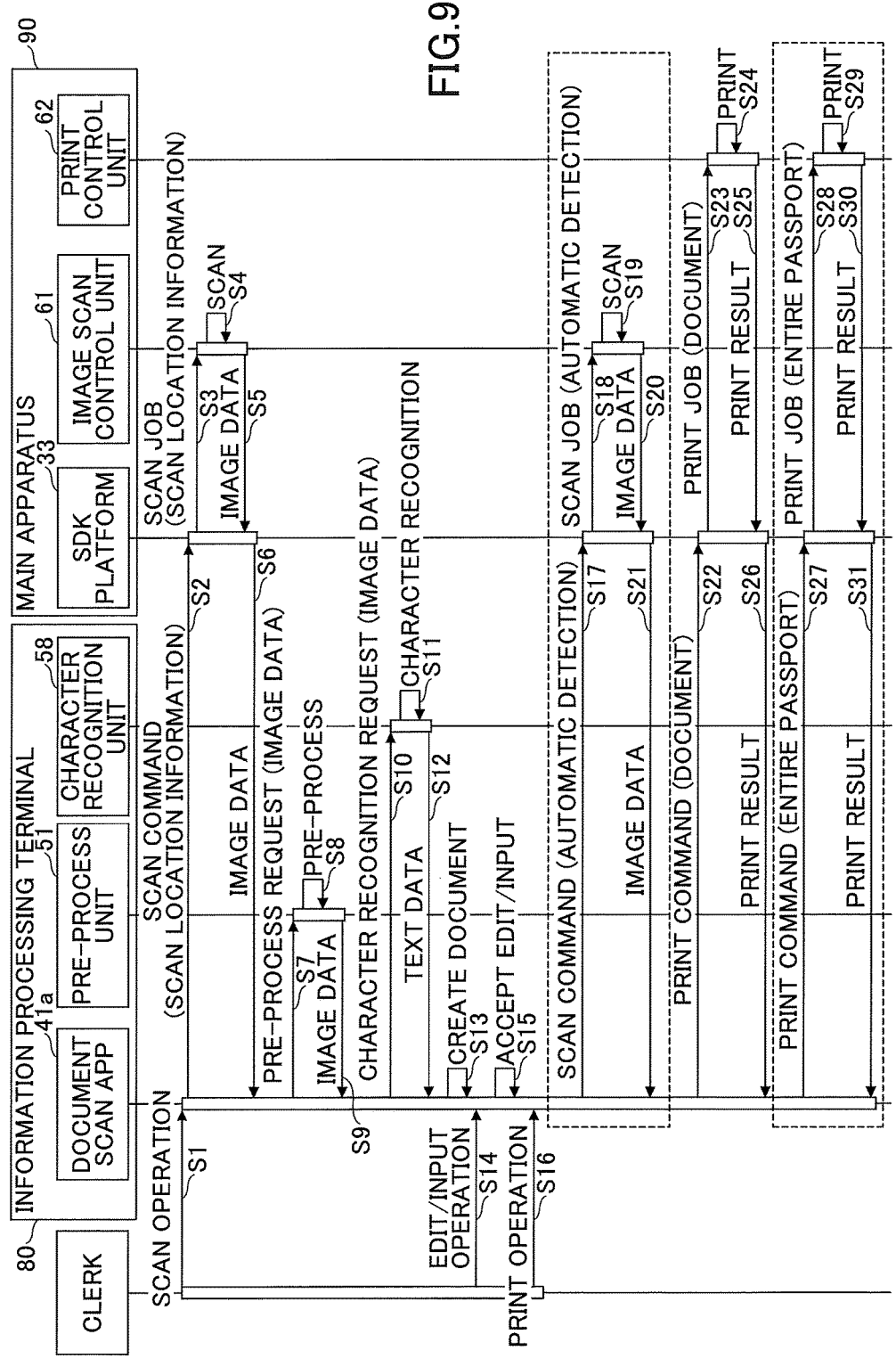
FIG. 9 is a sequence chart illustrating an example process in which the multifunction peripheral scans the machine readable zone of a passport to create and print out a "Record of Purchase of Consumption Tax-Exempt for Export" and a "Covenant of Purchase of Consumption Tax-Exempt for Ultimate Export"

In the following, an overall operation of the MFP 100 is described with reference to FIG. 9. FIG. 9 is a sequence chart illustrating an example process sequence of the MFP 100 scanning the MRZ region 70 of the passport 200 to create and print out a "Record of Purchase of Consumption Tax-Exempt for Export" and a "Covenant of Purchase of Consumption Tax-Exempt for Ultimate Export".

In step S1, a store clerk starts the document scan app 41a, places the passport 200 on the contact glass, and inputs a scan operation for instructing the document scan app 41a to scan the passport 200. The key/button control unit 43 of the information processing terminal 80 accepts the input scan operation. Note that FIGS. 12A and 12B illustrate example screens that may be displayed when the document scan app 41a is running.

In step S2, the app control unit 52 of the document scan app 41a transmits a scan command and the scan location information 57 to the main apparatus 90 in response to accepting the scan operation. Note that the scan command and the scan location information 57 may be transmitted at the same time, or one may be transmitted after the other.

In step S3, the SDK platform 33 receives the scan command and converts the received scan command into a description in a format that can be interpreted by the control service 34. For example, the scan command transmitted using HTTP may be converted into another language (e.g., C language) that is used in the main apparatus 90. The control service 34 generates a scan job based on the scan command. The SDK platform 33 transmits the scan job and the scan location information 57 to the image scan control unit 61.

By providing the SDK platform 33 that functions as an API as described above, even an app that is additionally installed in the information processing terminal 80 may be able to make a job request to the main apparatus 90 via the SDK platform 33. Note that without the SDK platform 33, an interface for accepting a job from a new app has to be provided in the main apparatus 90 such that development costs may be incurred for providing such an interface in the main apparatus 90.

In step S4, the image scan control unit 61 performs scanning based on the scan job and the scan location information 57. That is, the image scan control unit 61 scans the passport 200 in the main scanning direction and the sub scanning direction based on the scan location information 57 to generate image data of scan region including at least the MRZ region 70.

In step S5, the image scan control unit 61 transmits the image data of the MRZ region 70 to the SDK platform 33.

In step S6, the SDK platform 33 transmits the image data to the document scan app 41a using HTTP, for example.

In step S7, upon acquiring the image data of the MRZ region 70, the app control unit 52 of the document scan app 41a transmits a pre-process request and the acquired image data to the pre-process unit 51.

In step S8, the pre-process unit 51 receives the pre-process request and the image data and performs a pre-process on the image data.

In step S9, the pre-process unit 51 transmits the pre-processed image data to the app control unit 52 of the document scan app 41a.

In step S10, the app control unit 52 of the document scan app 41a receives the pre-processed image data and transmits a character recognition request and the pre-processed image data to the character recognition unit 58.

In step S11, the character recognition unit 58 receives the character recognition request and the pre-processed image data and performs a character recognition process on the pre-processed image data to obtain text data of the MRZ region 70.

In step S12, the character recognition unit 58 transmits text data of the MRZ region 70 acquired by the character recognition process to the app control unit 52 of the document scan app 41a.

In step S13, the app control unit 52 of the document scan app 41a receives the text data, and the document generation unit 54 generates a "Record of Purchase of Consumption Tax-Exempt for Export" and a "Covenant of Purchase of Consumption Tax-Exempt for Ultimate Export" using the received text data and the template stored in the document information DB 56. Note that the positions of characters and the information content provided in the MRZ region 70 are specified by international standards as indicated below in Table 1. The document generation unit 54 extracts one or more characters at a predetermined position of the MRZ from the text data and uses the extracted characters as a value for a corresponding input field.

In step S14, the store clerk edits and/or enters necessary items of information in the "Record of Purchase of Consumption Tax-Exempt for Export" and the "Covenant of Purchase of Consumption Tax-Exempt for Ultimate Export". That is, the store clerk checks the tax exemption documents generated by the document generation unit 54, makes appropriate edits as necessary, and enters items of information that are not included in the MRZ region 70 but are necessary for creating the "Record of Purchase of Consumption Tax-Exempt for Export" and the "Covenant of Purchase of Consumption Tax-Exempt for Ultimate Export". Note that FIGS. 13A-13C and 14 illustrate example screens for enabling the store clerk to make edits and enter necessary information.

In step S15, the key/button control unit 43 of the information processing terminal 80 accepts edits and inputs made by the store clerk.

In step S16, the store clerk checks the "Record of Purchase of Consumption Tax-Exempt for Export" and the "Covenant of Purchase of Consumption Tax-Exempt for Ultimate Export" reflecting the edits and inputs to see if there are any errors. If no errors are found, the store clerk inputs a print operation for printing the generated documents. The key/button control unit 43 of the information processing terminal 80 accepts the print operation.

Note that when the total amount of purchase of general goods exceeds 1 million yen, the processes of steps S17 to S21 are performed (described below).

In step S22, the app control unit 52 of the document scan app 41a transmits a print command and the generated tax exemption documents to the main apparatus 90 in response to the print operation.

In step S23, the SDK platform 33 receives the print command, and the control service 34 generates a print job based on the print command in a manner similar to the case of generating a scan command as described above. The SDK platform 33 transmits the print job and the tax exemption documents to the print control unit 62.

In step S24, the print control unit 62 performs printing based on the print job and the received tax exemption documents. In this way the MFP 100 can print out the tax exemption documents including the "Record of Purchase of Consumption Tax-Exempt for Export" and the "Covenant of Purchase of Consumption Tax-Exempt for Ultimate Export", for example.

In steps S25 and S26, the print control unit 62 transmits a print result to the information processing terminal 80 via the SDK platform 33.

Note that when the total amount of purchase of the general goods exceeds 1 million yen, processes of steps S27 to S31 are performed (described below).

Table 1 below indicates the information content provided in the MRZ region of a passport.

TABLE 1

| Line | Character Position | Length | Item Name | Character Type | Description |
|---|---|---|---|---|---|
| 1 | 1-2 | 2 | Passport/Type | Alphabet | "P<" is indicated as fixed characters indicating a passport |
|  | 3-5 | 3 | Issuing Country | Alphabet | Indicates issuing country. Indicated using ISO 3166-1 country code. |
|  | 6-44 | 39 | Name | Alphabet | Surname, followed by two filler characters "<<", followed by given name. Given names are separated by single filler character "<". E.g., if given name includes middle name: "surname<<first name<middle name" |
| 2 | 1-9 | 9 | Passport Number | Alphabet & Numeral | Indicates passport number. |
|  | 10 | 1 | Check Digit | Numeral | Check digit over digits 1-9 |
|  | 11-13 | 3 | Nationality | Alphabet | Indicated using ISO 3166-1 country code. |
|  | 14-19 | 6 | Date of Birth | Numeral | YYMMDD |
|  | 20 | 1 | Check Digit | Numeral | Check digit over digits 14-19 |
|  | 21 | 1 | Gender | Alphabet | M: male F: female |
|  | 22-27 | 6 | Expiry Date | Numeral | YYMMDD |
|  | 28 | 1 | Check Digit | Numeral | Check digit over digits 22-27 |
|  | 29-42 | 14 | Supplementary Information | Alphabet & Numeral | Not used in Japan |
|  | 43 | 1 | Check Digit | Numeral | Check digit over digits 29-42 "<" or "0" may be indicated if supplementary information is not used. |
|  | 44 | 1 | Check Digit | Numeral | Check digit over digits 1-10, 14-20, and 22-43 |

<Pre-Process>

FIGS. 10A-11B are diagrams describing an example pre-processing method. In the following descriptions, it is assumed that pre-processing has already been performed up to the binarization process as described above.

(1) As a result of the binarization process, image data as illustrated in FIG. 10A including black pixels outlining a character portion represented by white pixels is obtained. The character recognition unit 58 detects the outline. As illustrated in FIG. 10B, a plurality of point data 611 are detected at the boundary between the character and the background.

(2) Then, as illustrated in FIG. 10C, a rectangular frame (circumscribed rectangle) 612 is generated from the detected outline. The rectangular frame 612 may be obtained by determining the maximum and minimum values in the vertical and horizontal directions from among the plurality of point data 611.

(3) The above processes of (1) and (2) are performed with respect to all of the 88 characters included in the MRZ region 70, and in this way, 88 rectangular frames are extracted (see FIG. 10D).

(4) Then, as illustrated in FIG. 11A, a first line 613 is extracted. Note that X and Y coordinates with the origin set at the upper left corner are used. Specifically, with respect to two characters at the left end with the smallest X coordinate values, the one with the smaller Y coordinate value among the two characters is acquired, and with respect to two characters at the right end with the largest X coordinate values, the one with the smaller Y coordinate value among the two characters is acquired. Note that such process is performed with respect to all of the rectangles on the first line.

(5) Then, a second line 614 is extracted as illustrated in FIG. 11B. Specifically, with respect to two characters at the left end with the smallest X coordinate values, the one with the larger Y coordinate value among the two characters is acquired, and with respect to two characters at the right end with the largest X coordinate values, the one with the larger Y coordinate value among the two characters is acquired. Note that such process is performed with respect to all of the rectangles on the second line.

(6) Then, the first line and the second line are combined. In this way, the character recognition unit 58 may be able to perform a character recognition process. Note that a known character recognition technique may be used to perform the character recognition process.

<Example Screens>

FIG. 12A illustrates an example of a scan screen 620 displayed on the display 27 of the MFP 100 when the document scan app 41a is started. Note that the scan screen 620 may be displayed immediately after the document scan app 41a is started or may be displayed in response to some operation. The scan screen 620 is generated by the document scan app 41a and displayed by the screen display framework 45. The scan screen 620 displays a message 621 "Starting document creation. Please set identity information page of passport on upper left of glass surface and press start button." The scan screen 620 also includes a guide image 622 visually indicating how to place the passport 200 on the contact glass and a start button 623. The store clerk can perform operations according to the message 621. Also, the guide image 622 illustrates how to place the passport 200 on the contact glass with particular emphasis on the position of the MRZ region 70 of the passport 200. In this way, the store clerk may be less likely to mistakenly place the passport 200 in the wrong orientation, for example.

Note that the position of the MRZ region 70 in placing the passport 200 on the contact glass is specifically indicated in the guide image 622 so that the store clerk would not misplace the passport 200 in the wrong orientation. Also, in indicating the manner of placing the passport 200 on the contact glass in the guide image 622, the position of the MRZ region 70 is taken into account so that the moving distance of the carriage in scanning the MZR region 70 can be minimized.

FIG. 12B illustrates an example of a scan screen 630 displayed on the display 27 of the MFP 100 while the MFP 100 scans the passport 200. That is, the scan screen 630 of FIG. 12B is displayed when the start button 623 of FIG. 12A is pressed. In this way, the store clerk may confirm that the MRZ region 70 is being scanned and that a pre-process and a character recognition process are being performed on the scanned image, for example.

Figure 13B:
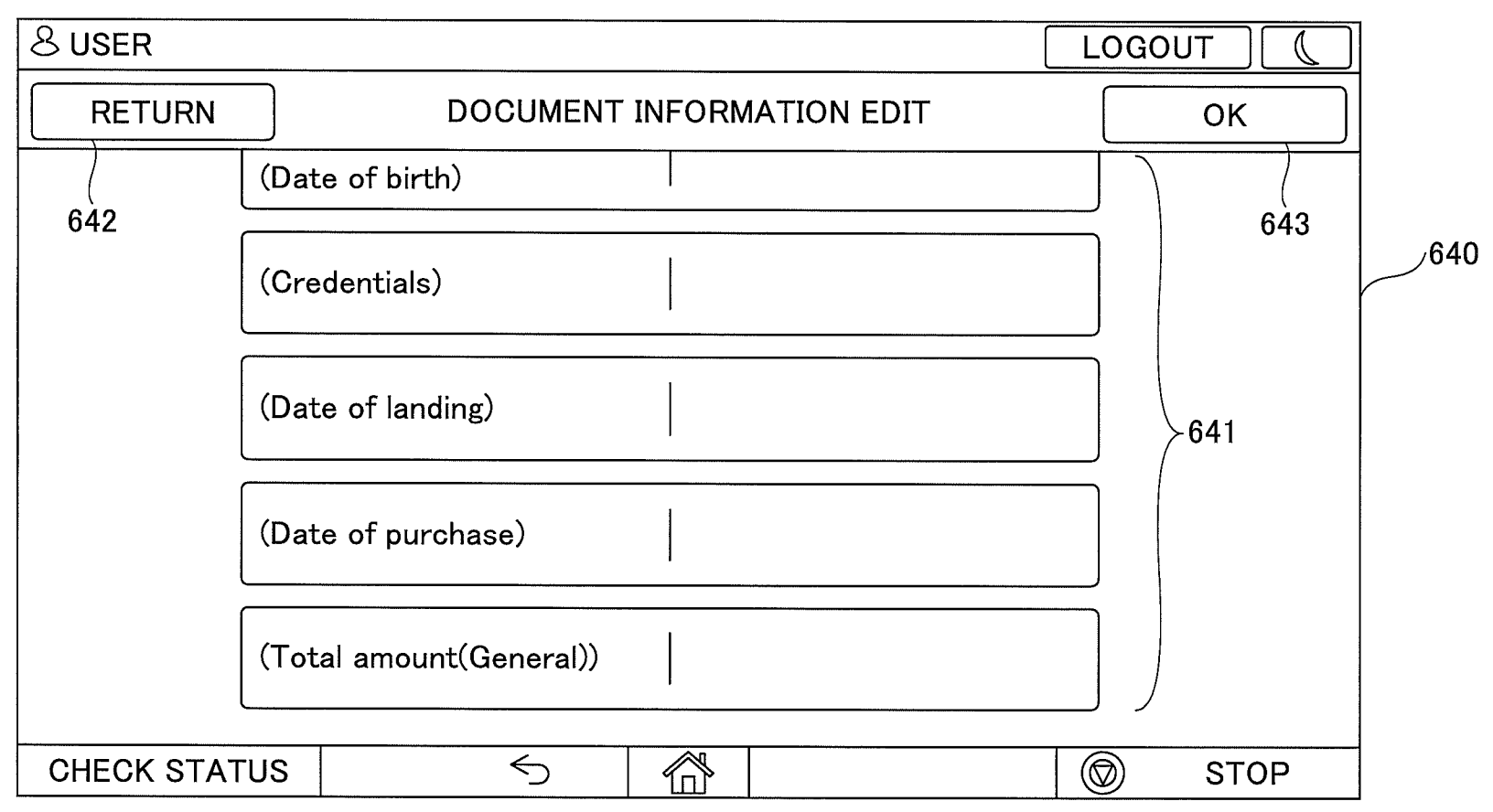

FIGS. 13A-13C illustrate example display portions of a document information edit screen 640. Note that the display 27 of the MFP 100 cannot display all the input items of the document information edit screen 640 at once. In the present embodiment, the store clerk can scroll the document information edit screen 640 to display the input items of the document information edit screen 640 as opposed to switching screens. Note that if the display 27 is large enough to display all the input items of the document information edit screen 640, scrolling may be unnecessary. Also, in some embodiments, the document information edit screen 640 may be divided into two or more sections, and the store clerk may display the input items of the document information edit screen 640 by switching screens. Further, in some embodiments, the document information edit screen 640 may be switched each time a different input item is to be displayed, for example.

The document information edit screen 640 of FIGS. 13A-13C is created by the document scan app 41a and is displayed by the screen display framework 45. The document information edit screen 640 mainly includes input fields 641, a return button 642, an OK button 643, and a message field 644.

The input fields 641 include input fields for inputting items of information, such as passport number (Passport No.), nationality, name, and date of birth, which can be acquired from the MRZ region 70. The input fields 641 also include input fields for inputting items of information, such as credentials, date of landing, date of purchase, total amount of purchase of general goods, total amount of purchase of consumable supplies, which have to be entered by the store clerk or the like.

The return button 642 is a button for returning to the scan screen 620 of FIG. 12A. For example, the return button 642 may be pressed by the store clerk when the store clerk wishes to rescan the passport 200. The OK button 643 is a button for enabling the store clerk to print out the "Record of Purchase of Consumption Tax-Exempt for Export" and the "Covenant of Purchase of Consumption Tax-Exempt for Ultimate Export".

The message field 644 displays a character recognition result and a message prompting a next operation. The character recognition result may indicate whether character recognition was successful or recognized characters include potential errors, for example. If the character recognition was successful, for example, the message field 644 may display a message indicating "Please remove passport and edit/enter other items." If potential errors are included in the recognized characters, the message field 644 may display a message indicating "There may be errors in the OCR result. An icon is displayed at the right side of the input field that may include errors and the input field will be left blank. After printing, please handwrite the correct information in the input field with the icon. Please enter edit/enter the input fields with no icons." Note that whether the character recognition was successful may be determined based on a set of conditions as indicated below in Table 2, for example.

When the store clerk presses (touches) a certain input field of the input fields 641, a screen for editing/inputting information in the corresponding input field may be displayed. In the following descriptions, it is assumed that the input field for inputting the total amount of purchase of general goods (general goods total amount) has been selected and a general goods total amount input screen 650 is displayed.

Figure 14:
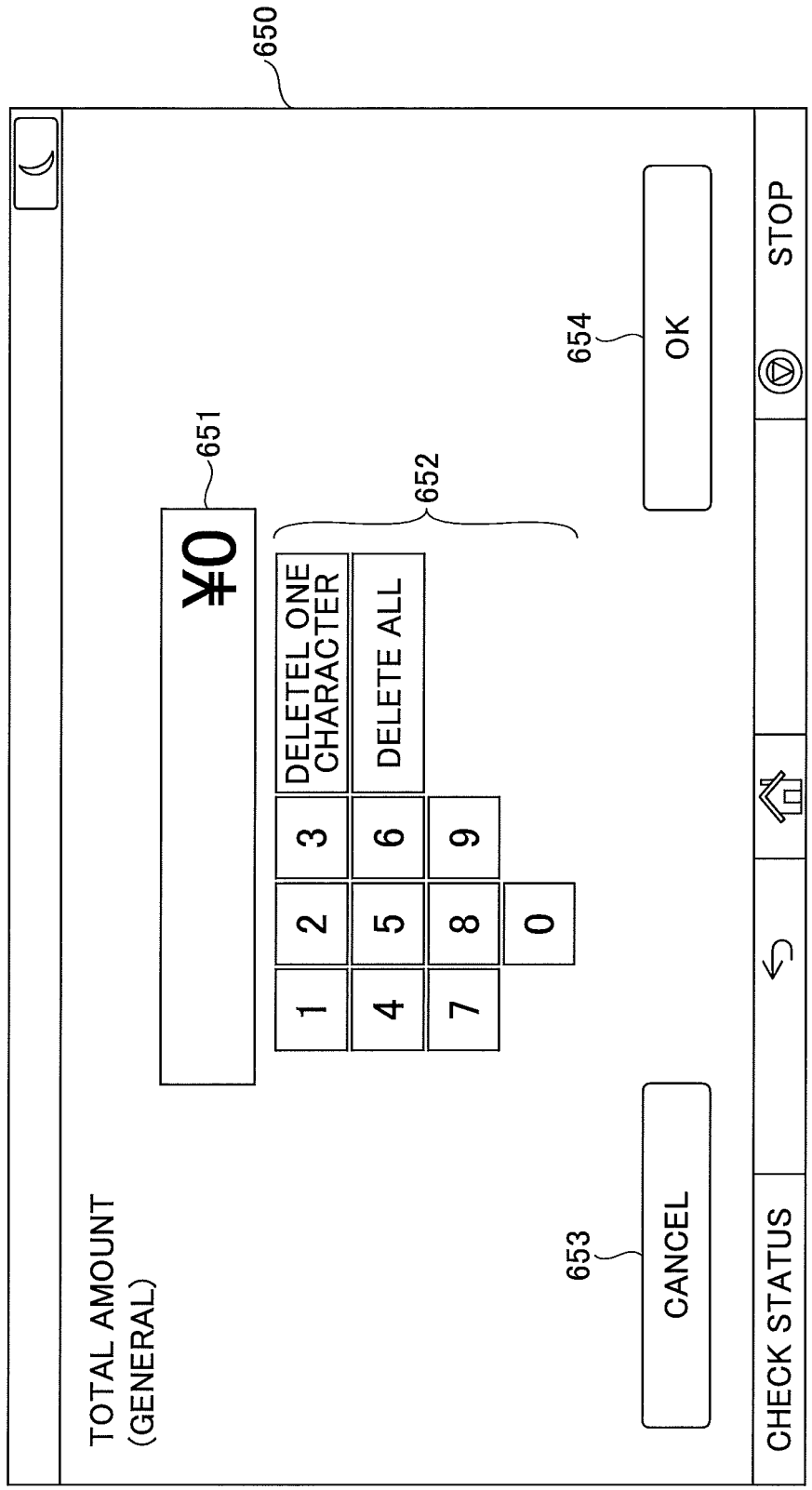
FIG. 14 is a diagram illustrating an example input screen for inputting a total amount of purchase of general goods.

FIG. 14 shows an example of the general goods total amount input screen 650. The general goods total amount input screen 650 includes ten keys 652, a cancel button 653, an OK button 654, and a total amount display field 651. The ten keys 652 are numeric keys for enabling the store clerk to input the general goods total amount. The cancel button 653 is a button for canceling an input and the OK button 654 is a button for confirming an input and reflecting it on the document information edit screen 640. The total amount display field 651 displays the total amount that has been input. In this way, an appropriate screen may be displayed for each input field such that the store clerk may be less likely to make errors in editing/inputting information in each input field, for example.

<Error Detection>

In the following, error detection of a character recognition result is described.

TABLE 2

| Item Name | Error Condition 1 | Error Condition 2 | Error Condition 3 |
|---|---|---|---|
| Passport/Type Name | — | — | — |
| Name | Other than A-Z and < | — | — |
| Passport Number | Other than 0-9, A-Z, and < | Non-numeric check digit | Check digit error |
| Nationality | Other than A-Z and < | Non-matching country code | — |
| Date of Birth | Other than 0-9 | Non-numeric check digit | Check digit error |

Table 2 illustrates an example set of error detection conditions for detecting errors in a character recognition result. Note that whether "error condition 1" is satisfied is determined based on the actual text data obtained by executing a character recognition process. For example, if the information item "Name" includes characters other than "A-Z and <", it is determined that the character recognition result for the information item "Name" includes errors. The determination of whether "error condition 2" and "error condition 3" are satisfied is made based on a corresponding check digit. A check digit is a value calculated from values of a series of characters and is used to check for errors in the series of characters. For example, values of characters indicated in a specified calculation range (position range) may be multiplied by certain coefficients according to a predetermined rule after which the multiplied values are added together, and the remainder of the sum value divided by a predetermined coefficient may be set up as the check digit for the characters. If there are errors in the character recognition result of characters indicated in the specified calculation range, there will be a substantial discrepancy between a check digit calculated for the recognized characters and the check digit for the true characters. In this way, errors may be detected in a character recognition result, for example.

Note that the "error condition 2" is used for detecting an error when the check digit is not a number (i.e., the check digit is erroneously recognized) or when the country code does not match any country. The "error condition 3" is used to detect an error when a value calculated from the recognized characters and the value of the check digit indicated for these characters do not match. Thus, if one or more of the error conditions 1-3 are satisfied, a character recognition result may be determined to include some type of error.

FIG. 15 illustrates an example of the document information edit screen 640 that may be displayed when an error under "error condition 1" is detected. Specifically, FIG. 15 illustrates an example of the document information edit screen 640 that may be displayed when an error is detected in the information item "date of birth". That is, a character 656 other than "A-Z and <" is included in the recognized characters representing the "date of birth", and as such, the app control unit 52 displays an icon 655 indicating that an error is included in the information item "date of birth". Also, in FIG. 15, the character 656 other than "A-Z and <" is displayed in inverted colors to highlight the erroneously recognized character. In this way, the store clerk may be able to easily recognize the erroneously recognized character.

Note that in some embodiments, highlighting as illustrated in FIG. 15 may be used not only to indicate an erroneously recognized character detected based on the error condition 1 but also to indicate a character that may be inaccurate based on a level of accuracy of character recognition. That is, the character recognition unit 58 may determine the level of accuracy for each recognized character. Also, the character recognition unit 58 may notify the app control unit 52 of a character with a level of accuracy below a predetermined threshold value. Thus, the app control unit 52 may display the icon 655 by the input field including the character with the level of accuracy below the predetermined threshold value and highlight this character, for example.

Also, in some embodiments, error detection may be performed not only with respect to character recognition but also with respect to the orientation of the passport 200, for example. As illustrated in the scan screen 620 of FIG. 12A, the orientation of the passport 200 is specified for scanning the passport 200. When the store clerk incorrectly places the passport 200, the app control unit 52 may display an error message on the scan screen 620, for example.

Figure 16A:
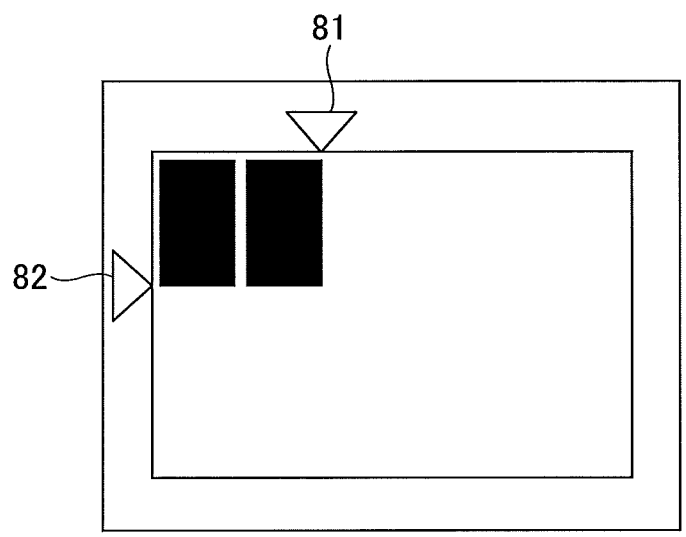
Figure 16B:
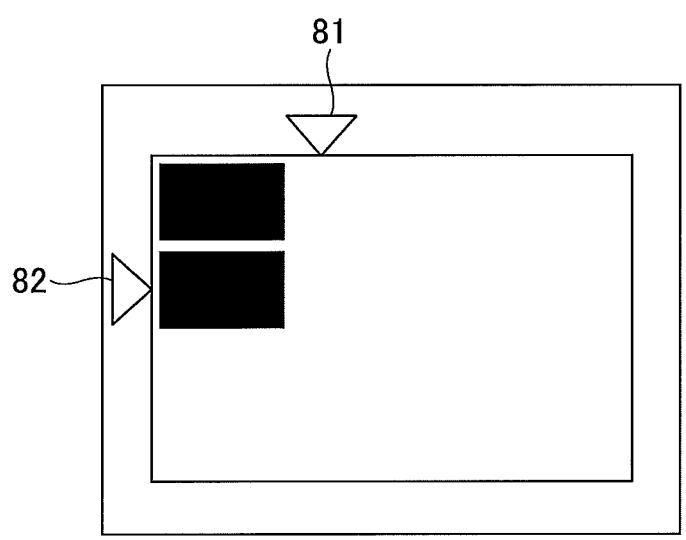

FIGS. 16A and 16B are diagrams for explaining the detection of an error in the orientation of the passport 200. The MFP 100 includes paper sensors for detecting the size of a document (e.g. A4, A5, B5). The size of the passport 200 is not mandatorily specified by international standards but a certain size is recommended. Thus, the size of passports of many countries is about the same (B7 in Japan). The app control unit 52 can determine whether the orientation of the passport 200 is correct based on signals from the paper sensors. In FIG. 16A, paper sensors 81 and 82 detect the passport 200 in the main scanning direction and the sub scanning direction. Thus, the app control unit 52 may determine that the orientation of the passport 200 is correct. On the other hand, in FIG. 16B, the paper sensor 82 detects the passport 200 in the main scanning direction but the paper sensor 81 does not detect the passport 200 in the sub scanning direction. As such, the app control unit 52 may determine that the orientation of the passport 200 is incorrect.

In this case, the app control unit 52 may display a message 624 indicating "Please check orientation of passport!" on the scan screen 620 as illustrated in FIG. 16C, for example. In this way, the store clerk may be prompted to check the orientation of the passport 200. Note that in some embodiments, audio, light, or some other type of signal may be output together with the message 624 to alert the store clerk of the incorrect orientation of the passport 200, for example. Also, in some embodiments, the app control unit 52 may control the screen 620 to refrain from accepting an operation of the start button 623 when an error is detected in the orientation of the passport 200, for example. In this way, the passport 200 may be prevented from being scanned when it is not in the correct orientation, for example. When the passport 200 is set in the manner indicated on the display 27, the app control unit 52 may instruct the image scan control unit 61 to scan the passport 200. If the app control unit 52 determines that the orientation of the passport 200 is incorrect, even if the key/button control unit 43 detects a pressing operation of the start button 623 and notifies the document scan app 41a of the operation, the document scan app 41a may refrain from transmitting a corresponding scan command to the main apparatus 90. Alternatively, the app control unit 52 may notify the key/button control unit 43 to refrain from detecting a pressing operation of the start button 623, for example.

<Tax Exemption Documents>

FIGS. 17A and 17B respectively illustrate examples of a "Record of Purchase of Consumption Tax-Exempt for Export" and a "Covenant of Purchase of Consumption Tax-Exempt for Ultimate Export" to be printed. Note that the formats of these tax exemption documents are not particularly limited as long as the required items of information are indicated therein. That is, FIGS. 17A and 17B merely illustrate example formats of the tax exemption documents. The MFP 100 may print out the "Record of Purchase of Consumption Tax-Exempt for Export" and the "Covenant of Purchase of Consumption Tax-Exempt for Ultimate Export" after setting up information acquired by scanning the MRZ region 70 of the passport 200 and information input by the store clerk in the corresponding input fields.

<Process Switching Based on Whether General Goods Total Amount Exceeds 1 Million Yen>

Under the consumption tax exemption system for foreigners visiting Japan, when the total amount of purchase of general goods (general goods total amount) exceeds 1 million yen, the seller (business owner) is obliged to retain a copy of the passport of the purchaser at the place of sale or the place for tax payment of the business owner. As such, when the general goods total amount exceeds 1 million yen, the MFP 100 needs to generate image data of the entire face of the passport 200. Accordingly, in the present embodiment, when the store clerk inputs a print operation, the determination unit 53 determines whether the general goods total amount exceeds 1 million yen, and the app control unit 52 switches processes based on the determination result. Note that 1 million yen is merely the general goods total amount threshold specified by current rules. That is, the general goods total amount threshold may be less than 1 million yen or more than 1 million yen. Also, note that the general goods total amount threshold may vary from country to country.

Figure 18:
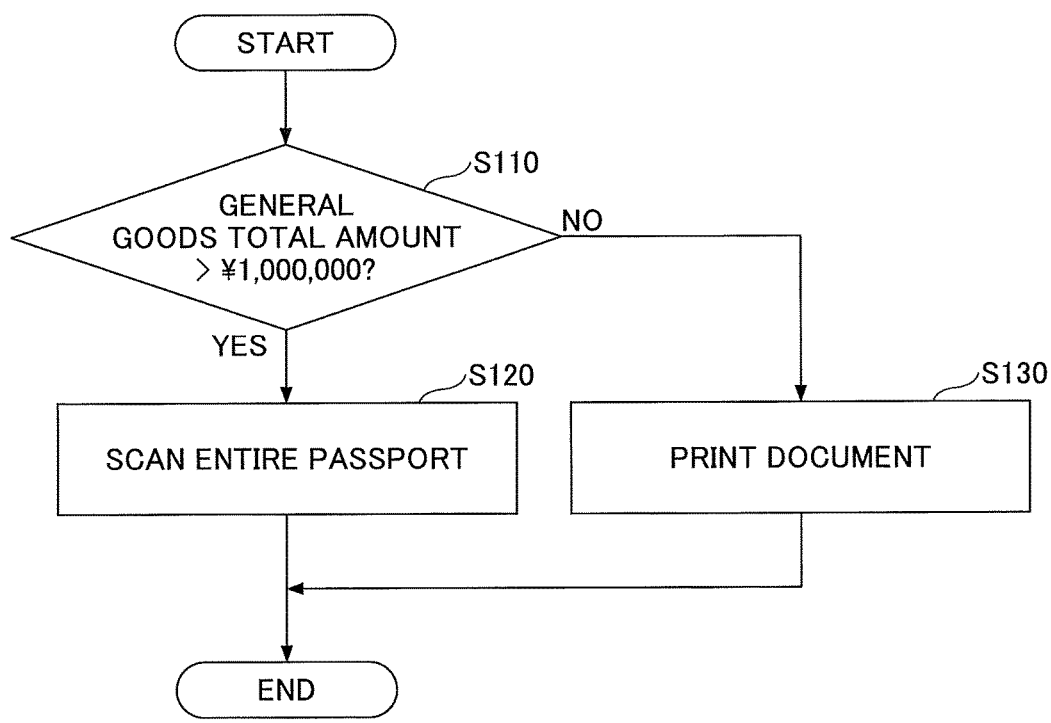
FIG. 18 is a flowchart illustrating an example operation implemented by the multifunction peripheral for switching processes based on whether the total amount of purchase of general goods exceeds 1 million yen.

FIG. 18 is a flowchart illustrating an example process of the MFP 100 switching processes depending on whether the general goods total amount exceeds 1 million yen. The process illustrated in FIG. 18 starts when the store clerk inputs a print operation (e.g., by pressing the OK button 643 of the document information edit screen 620).

In step S110, the determination unit 53 determines whether the general goods total amount input by the store clerk exceeds 1 million yen (exceeds a threshold value).

If a positive determination (YES) is made in step S110, the app control unit 52 determines that the entire face of the passport 200 has to be scanned (S120). In this case, the processes of steps S17 to S21 of FIG. 9 are executed.

If a negative determination (NO) is made in step S110, the app control unit 52 determines to print the tax exemption documents (S130). In this case, the processes of steps S22 to S26 of FIG. 9 are executed.

As described above, the app control unit 52 automatically switches processes to be executed by comparing the general goods total amount with a threshold value (e.g., 1 million yen). Thus, the store clerk may be relieved of the burden of having to make the above determination and prompt the MFP 100 to scan the entire face of the passport 200 as necessary, for example.

In the following, the processes of steps S17 to S21 of FIG. 9 are described.

In step S17, the app control unit 52 of the document scan app 41a transmits a scan command and document size automatic detection to the main apparatus 90. Note that in step S17, the scan location information 57 is not transmitted. The document size automatic detection indicates that the document size of the medium to be scanned (passport in the present embodiment) is to be detected by the paper sensors 81 and 82, and the image scan control unit 61 is to determine a scan range based on the detected document size. Alternatively, a document size larger than the size of the passport 200 (in the opened state), such as A5, or the size of the passport 200 may be specified by the store clerk, for example.

In step S18, the SDK platform 33 receives the scan command and converts the received scan command into a scan job in a format that can be interpreted by the control service 34. The SDK platform 33 transmits the scan job and the document size automatic detection to the image scan control unit 61.

In step S19, the image scan control unit 61 detects the document size of the passport 200 using the paper sensors, determines the scan range, and performs scanning based on the scan job. In this way, the entire face of the passport 200 is scanned to capture image data of the entire face of the passport 200.

In step S20, the image scan control unit 61 transmits the image data of the entire face of the passport 200 to the SDK platform 33.

In step S21 the SDK platform 33 transmits the image data to the document scan app 41a using HTTP, for example. Thereafter, the document scan app 41a executes the processes of steps S22 to S26 as described above and the processes steps S27 to S31 described below.

In step S27, when printing of the tax exemption documents is completed, the app control unit 52 of the document scan app 41a transmits a print command and the image data of the entire face of the passport 200 to the main apparatus 90.

In step S28, the SDK platform 33 receives the print command, and the control service 34 generates a print job based on the print command. The SDK platform 33 transmits the print job and the image data of the entire face of the passport 200 to the print control unit 62.

In step S29, the print control unit 62 performs printing based on the print job and the image data of the entire face of the passport 200. In this way, the MFP 100 can print a copy of the passport 200 on sheet material such as paper.

In steps S30 and S31, the print control unit 62 transmits the print result to the information processing terminal 80 via the SDK platform 33. In this way, when the general goods total amount of exceeds 1 million yen, the MFP 100 can print the tax exemption documents ("Record of Purchase of Consumption Tax-Exempt for Export" and "Covenant of Purchase of Consumption Tax-Exempt for Ultimate Export") as well as a copy of the passport 200.

Note that in some embodiments, instead of dividing the print job into two (processes of steps S22 to S26 and processes of steps S27 to S31) as described above, the tax exemption documents and the copy of the passport 200 may be printed based on one print job, for example. That is, because the processes of steps S17 to S21 and the processes of steps S27 to S31 are both copying processes, the processes of steps S17 to S21 may be executed followed by the processes of steps S27 to S31 as one copy job. For example, after step S15, the processes of steps S22 to S26 may be executed, followed by the processes of steps S17 to S21 and the processes of steps S27 to S31.

<Process Modification>

In some embodiments, the scan location information 57 may be transmitted to the main apparatus 90 before the scan command. In such case, the process sequence in which the MFP 100 scans the MRZ of a passport to create and print out tax exemption documents may be performed as follows, for example.

Figure 19:
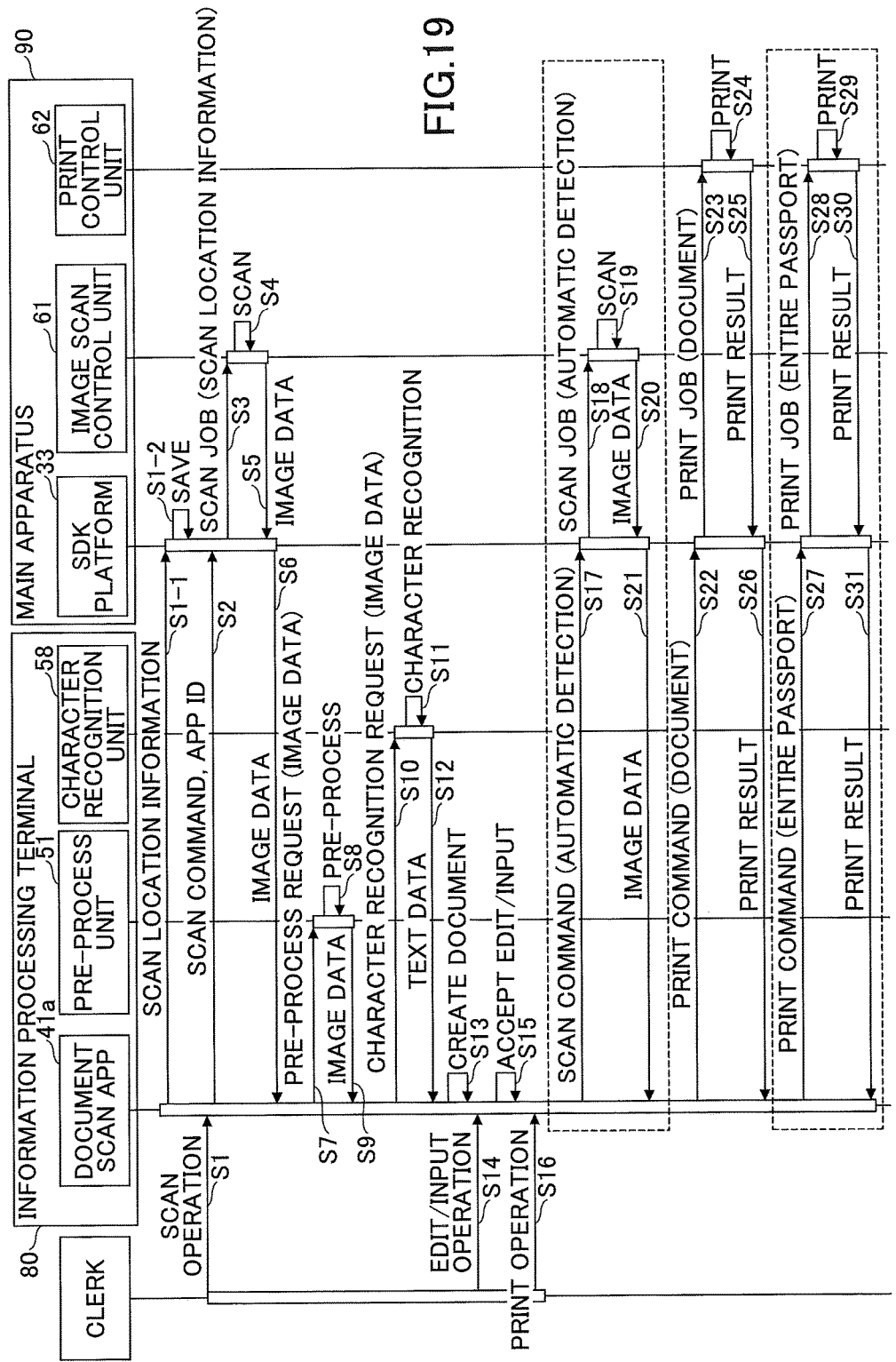
FIG. 19 is a sequence chart illustrating another example process in which in which the multifunction peripheral scans the machine readable zone of a passport to create and print out "Record of Purchase of Consumption Tax-Exempt for Export" and a "Covenant of Purchase of Consumption Tax-Exempt for Ultimate Export"

FIG. 19 is a sequence chart illustrating an example process sequence in which the MFP 100 scans the MRZ region 70 of the passport 200 to create and print out tax exemption documents. Note that in FIG. 19, process steps that are substantially identical to the process steps of FIG. 9 are given the same reference numerals and their descriptions may be omitted. In the following, features of the process sequence of FIG. 19 that differ from those of FIG. 9 are described.

In step S1-1, the app control unit 52 of the document scan app 41a transmits the scan location information 57 to the main apparatus 90. That is, the app control unit 52 transmits the scan location information 57 to the SDK platform 33 before transmitting the scan command. Note that the scan location information 57 may be transmitted any time before the scan command is transmitted, such as when the document scan app 41a is started, after the document scan app 41a is started, when communication with the main apparatus 90 becomes possible, or when a request for the scan location information 57 is received from the main apparatus 90, for example.

In step S1-2, the SDK platform 33 saves the scan location information 57 in the RAM 13, for example. Then, in step S2, the document scan app 41a transmits a scan command to the main apparatus 90. The main apparatus 90 performs scanning based on the scan location information 57 stored in the RAM 13.

Note that when a scan command is transmitted to the main apparatus 90 from a device other than the information processing terminal 80, the main apparatus 90 may perform a scanning operation based on the scan location information 57 in response to the scan command from the other device. Thus, in a preferred embodiment, an app ID is used to control operations of the MFP 100 as described below.

First, in step S1-1, the app control unit 52 of the document scan app 41a transmits an app ID of the document scan app 41a together with the scan location information 57. The app ID may be information identifying the document scan app 41a (e.g., app name) or a serial number of the document scan app 41a. The app ID is information used to notify the main apparatus 90 of the source (sender) of the scan location information 57. Also, in some embodiments, an ID of the store clerk may be used instead of the app ID, for example. The SDK platform 33 stores the scan location information 57 and the app ID in association with each other.

TABLE 3

| App ID | Scan Location Information |
|---|---|
| APL123 | 125 × 20 |

Table 3 schematically illustrates an example of the scan location information 57 ("125×20") being stored in association with an app ID ("APL123") by the SDK platform 33. In this way, the scan location information 57 may be associated with a corresponding app ID.

Then, when transmitting a scan command to the main apparatus 90 in step S2, the app control unit 52 of the document scan app 41a transmits the app ID of the document scan app 41a together with the scan command. In the case where no information specifying the scan range is transmitted along with the scan command, the main apparatus 90 performs scanning based on the scan location information 57 associated with the app ID. In this way, the app control unit 52 of the document scan app 41a can transmit the scan location information 57 to the main apparatus 90 before transmitting a scan command and control the main apparatus 90 to perform scanning based on the scan location information 57.

Note that in some embodiments, the information indicated in Table 3 may be stored in a non-volatile memory, for example. In this case, the app control unit 52 of the document scan app 41a may only have to transmit the scan location information 57 and the app ID to the main apparatus 90 once.

<Other Example of Scan Location Information>

The MRZ region 70 described above is located at the lowermost portion of the passport 200. However, the document scan app 41a of the present embodiment may flexibly accommodate changes in the location of the MRZ region 70.

Figure 20:
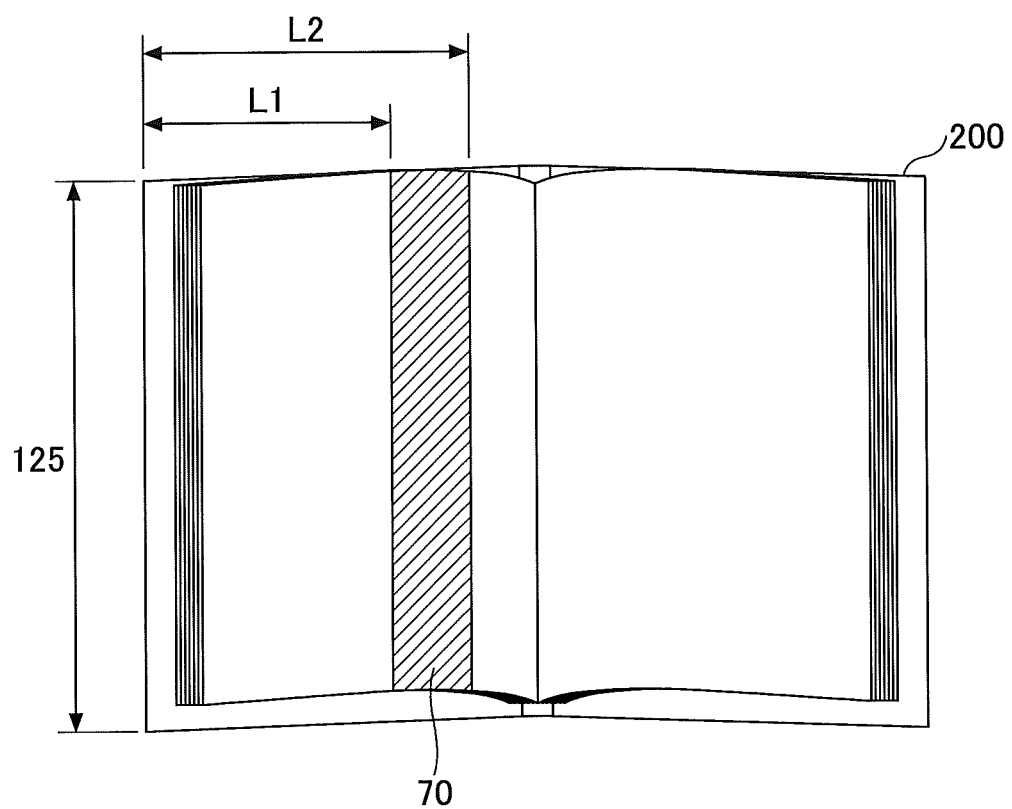
FIG. 20 is a diagram showing an example of a machine readable zone that is not located at the lowermost portion of a passport.

FIG. 20 is a diagram showing an example of the MRZ region 70 that is not located at the lowermost portion of the passport 200. In FIG. 20, the MRZ region 70 is still 125 [mm] in the main scanning direction, however, its position in the sub scanning direction is in the range of L1 [mm] to L2 [mm] from the lowermost portion on the passport 200.

In this case, for example, "125, L2 " may be transmitted to the main apparatus 90 as the scan location information 57 to indicate that the MFP 100 only needs to scan the passport 200 from the scan starting position (e.g., lowermost portion of the passport 200) up to L2, and the character recognition unit 58 may be controlled to perform character recognition with respect to image data of the region from L1 to L2 (hatched portion) of FIG. 20.

Note that in the example of FIG. 20, the region from the scan starting position to L1 does not necessarily have to be scanned, and as such, if the MFP 100 is capable of skipping a scanning operation from the scan starting position to L1, the scanner of the MFP 100 may be swiftly moved from the scan starting position to L1 to only scan the region from L1 to L2, for example. In this case, for example, "125, L1, L2 " may be transmitted as the scan location information 57 to control the scanner to scan the region between L1 and L2.

As described above, the MFP 100 according to the present embodiment can be controlled to mainly scan the MRZ region 70 of the passport 200, and in this way, the time required for scanning and acquiring target information from a medium can be reduced.

<Other Application Examples>

Although the present invention has been described above with reference to certain illustrative embodiments, the present invention is not limited to these embodiments, and numerous variations and modifications may be made without departing from the scope of the present invention.

For example, the above-described embodiments are implemented in connection with tax exemption for goods. However, the present invention can also be implemented in connection with tax exemption for services. Also, although the above-described embodiments are based on the tax exemption system in Japan, the present invention can also be implemented in accordance with tax exemption systems of other countries.

Further, although the MFP 100 described above performs a character recognition process on the MRZ region 70 to acquire target information, the MRZ region 70 may alternatively include a barcode or a two-dimensional barcode, for example. Even in such case, the MFP 100 may be able to recognize and acquire target information based on the scan location information 57, for example.

Also, as described above, the information processing terminal 80 and the main apparatus 90 may communicate wirelessly. However, in some embodiments, the information processing terminal 80 and the main apparatus 90 may communicate via a server. For example, the information processing terminal 80 and the main apparatus 90 may be registered in association with each other in the server, and communication from the information processing terminal 80 to the main apparatus 90 or communication from the main apparatus 90 to the information processing terminal 80 may be implemented via the server. Also, in some embodiments, an app of the information processing terminal 80 may be implemented by a web application that is run on an external server apparatus, for example. In this case, the information processing terminal 80 may communicate with the external server apparatus via a communication network to control the app that is run on the external server device. For example, based on control of the app by the information processing terminal 80, the app may transmit a scan command or a print command to the information processing terminal 80, and in turn, the information processing terminal 80 may transmit the received scan command or print command to the main apparatus 90. Note that the scan command or the print command may also be directly transmitted from the app to the main apparatus 90 without passing through the information processing terminal 80, for example.

Also, note that in FIGS. 6 and 7, the processes of the MFP 100 are divided up into process units according to the main functions of the MFP 100 in order to facilitate understanding of the processes implemented by the MFP 100. However, the present invention is not limited to such division of process units. For example, the processes of the MFP 100 can be divided into further process units according to the processing content. Also, a process of a given process unit may be divided up into further processes.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may be implemented processors of any desired type and number. For example, the CPU may be implemented by at least one processor. The RAM may include any desired volatile or nonvolatile memory. The HDD may be implemented by any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

What is claimed is:

1. An image processing apparatus comprising:
a main apparatus; and
an information processing terminal, wherein
the main apparatus includes
a scanning device configured to scan at least a portion of a medium including a scan region where target information is provided, and
a first processor configured to control the scanning device;
the information processing terminal includes
a second processor configured to execute a program stored in a memory to implement processes of
running a document scanning application selected from among a plurality of applications provided at the information processing terminal to generate an electronic document relating to tax exemption that includes a corresponding input field for inputting the target information including purchaser information relating to a purchaser of a tax exempt article, the document scanning application inputting the target information to the corresponding input field,
controlling the document scanning application to send scan instructions to the main apparatus instructing the scanning device to scan the medium and determine position information of the scan region based on scan region setting information stored in association with the document scanning application, the scan region being provided at a specified scan size smaller than a size of the medium upon accepting a scan instruction from a user while the document scanning application is running;
the first processor, upon receiving the scan instructions from the information processing terminal, controls the scanning device to scan the scan region of the medium, the scan region including a region of the medium on which the target information is printed, and capture image data of the scan region at the specified scan size indicated in the received scan instructions and the determined position information of the scan region indicated in the scan region setting information, the medium being identification documentation of the purchaser of the tax-exempt article; and
the second processor further
executes a character recognition process on the image data of the scan region at the specified scan size captured by the scanning device to acquire the target information, and
controls the document scanning application to generate the electronic document including the target information acquired by the character recognition process input to the corresponding input field, wherein the scan region setting information stored in association with the document scanning application is set up in advance of accepting the scan instruction from the user.

2. The image processing apparatus according to claim 1, wherein the second processor controls the document scanning application to cause a display device to display a prescribed manner of placing the medium that minimizes a moving distance of the scanning device in scanning the scan region of the medium.

3. The image processing apparatus according to claim 2, wherein the scan instructions sent to the main apparatus further instruct the scanning device to scan the scan region when the medium is placed in the prescribed manner displayed on the display device.

4. The image processing apparatus according to claim 3, wherein the execution of the program further causes the second processor to
send placement detection instructions to the main apparatus instructing the scan device to detect whether the medium is placed in the prescribed manner; and when the scan device detects that the medium is not placed in the prescribed manner, the second processor controls the document scanning application to issue a notification indicating that the medium is not placed appropriately.

5. The image processing apparatus according to claim 4, wherein
when the scan device detects that the medium is not placed in the prescribed manner, the second processor controls the document scanning application to refrain from accepting the scan instruction from the user.

6. The image processing apparatus according to claim 4, wherein the execution of the program further causes the second processor to
detect a potential error in the target information acquired by the character recognition process; and
upon displaying the electronic document including the target information acquired by the character recognition process input to the corresponding input field on the display device, control the document scanning application to highlight the corresponding input field including the target information with the potential error.

7. The image processing apparatus according to claim 1, wherein the main apparatus further comprises:
a printing device that is configured to print an image on a sheet material, and that is controlled by the first processor, wherein
the document scanning application sends print instructions to the main apparatus to instruct the printing device to print the electronic document upon accepting a print instruction from the user.

8. The image processing apparatus according to claim 7, wherein the execution of the program further causes the second processor to
accept an input of a numerical value from the user;
control the document scanning application to determine whether the numerical value accepted by the second processor exceeds a threshold value upon accepting the print instruction from the user, and to instruct the printing device to print the electronic document upon determining that the numerical value does not exceed the threshold value; and
upon determining that the numerical value exceeds the threshold value, control the document scanning application to instruct the scanning device to scan the medium and capture image data of the medium at the size of the medium and to instruct the printing device to print the electronic document and the image data of the medium captured at the size of the medium.

9. The image processing apparatus according to claim 1, wherein
the second processor controls the document scanning application to convey the specified scan size including the scan region of the medium to the scanning device before the document scanning application instructs the scanning device to scan the medium; and
the scanning device stores the specified scan size including the scan region of the medium in association with the document scanning application.

10. The image processing apparatus according to claim 1, wherein the execution of the program further causes the second processor to
install an additional application; and
the additional application is configured to convey the specified scan size including the scan region of the medium to the scanning device.

11. The image processing apparatus according to claim 1, wherein
the medium is a passport, and the scan region is a machine readable zone included in the passport.

12. The image processing apparatus according to claim 1, wherein the image processing apparatus further comprises:
a display,
wherein the second processor executes the program stored in the memory to further implement processes of:
controlling the document scanning application to instruct the scanning device to
determine whether an orientation of the medium matches a specified orientation of the medium, whereby the second processor acquires position information of the scan region based on scan region setting information stored in association with the document scanning application, in a case where the orientation of the medium matches the specified orientation;
generating a screen to be displayed on the display in a case where the orientation of the medium does not match the specified orientation, the generated screen indicating that the orientation of the medium does not match the specified orientation; and
preventing further processing of the medium until the orientation of the medium is adjusted to match the specified orientation.

13. The image processing apparatus according to claim 1, wherein
a storage device configured to store the electronic document including the corresponding input field for inputting the target information is provided at either of the main apparatus or the information processing terminal.

14. The image processing apparatus according to claim 1, wherein the purchaser information included in the target information relates to one or more of the purchaser's nationality, name, or date-of-birth.

15. An image processing method implemented by an image processing apparatus comprising a main apparatus that includes a scanning device configured to scan a medium including a scan region where target information is provided, and a first processor configured to control the scanning device; and an information processing terminal that includes a second processor, the image processing method comprising:
running a document scanning application, by the second processor, selected from among a plurality of applications provided at the information processing terminal to generate an electronic document relating to tax exemption, that includes a corresponding input field for inputting the target information including purchaser information relating to a purchaser of a tax exempt article, and inputting the target information to the corresponding input field;
controlling the document scanning application, by the second processor, to send scan instructions to the main apparatus instructing the scanning device to scan the medium and determine position information of the scan region based on scan region setting information stored in association with the document scanning application, the scan region being provided at a specified scan size smaller than a size of the medium upon accepting a scan instruction from a user while the document scanning application is running;
controlling the scanning device, by the first processor upon the first processor receiving the scan instructions from the information processing terminal, to scan the scan region of the medium, the scan region including a region of the medium on which the target information is printed, and capture image data of the scan region at the specified scan size indicated in the received scan instructions and the determined position information of the scan region indicated in the scan region setting information, the medium being identification documentation of the purchaser of the tax-exempt article;

executing a character recognition process, by the second processor, on the image data of the scan region at the specified scan size captured by the scanning device to acquire the target information; and controlling the document scanning application, by the second processor, to generate the electronic document including the target information acquired by the character recognition process input to the corresponding input field, wherein the scan region setting information stored in association with the document scanning application is set up in advance of accepting the scan instruction from the user.

16. The image processing method according to claim 15, wherein the document scanning application causes a display device to display a prescribed manner of placing the medium that minimizes a moving distance of the scanning device in scanning the scan region of the medium.

17. The image processing method according to claim 16, wherein the document scanning application instructs the scanning device to scan the scan region when the medium is placed in the prescribed manner displayed on the display device.

18. The image processing method according to claim 16, wherein the processor further implements a process of detecting whether the medium is placed in the prescribed manner; and when the processor detects that the medium is not placed in the prescribed manner, the document scanning application refrains from accepting the scan instruction from the user.

19. The image processing method according to claim 15, further comprising:

a printing device configured to print an image on a sheet material;

wherein the document scanning application instructs the printing device to print the electronic document upon accepting a print instruction from the user.

20. The image processing method according to claim 19, wherein the processor further implements a process of accepting an input of a numerical value from the user;

the document scanning application determines whether the numerical value accepted by the processor exceeds a threshold value upon accepting the print instruction from the user, and instructs the printing device to print the electronic document upon determining that the numerical value does not exceed the threshold value; and upon determining that the numerical value exceeds the threshold value, the document scanning application instructs the scanning device to scan the medium and capture image data of the medium at the size of the medium and instructs the printing device to print the electronic document and the image data of the medium captured at the size of the medium.

21. The image processing method according to claim 15, wherein the document scanning application conveys the specified scan size including the scan region of the medium to the scanning device before instructing the scanning device to scan the medium; and the scanning device stores the specified scan size including the scan region of the medium in association with the document scanning application.

22. The image processing method according to claim 15, wherein the medium is a passport, and the scan region is a machine readable zone included in the passport.

23. The image processing method according to claim 15, the method further comprising:

determining whether an orientation of the medium matches a specified orientation of the medium;

acquiring position information of the scan region, by the second processor, based on scan region setting information stored in association with the document scanning application in a case where the orientation of the medium matches the specified orientation;

generating a screen to be displayed on a display of the image processing apparatus in a case where the orientation of the medium does not match the specified orientation, the generated screen indicating that the orientation of the medium does not match the specified orientation; and preventing further processing of the medium until the orientation of the medium is adjusted to match the specified orientation.

24. The image processing method according to claim 15, wherein the electronic document including the corresponding input field for inputting the target information is stored in a storage device that is provided at either of the main apparatus or the information processing terminal.

25. The image processing method according to claim 15, wherein the purchaser information included in the target information relates to one or more of the purchaser's nationality, name, or date-of-birth.

26. A non-transitory computer-readable medium storing a program to be executed by an image processing apparatus comprising a main apparatus that includes a scanning device configured to scan a medium including a scan region where target information is provided and a first processor configured to control the scanning device; and an information processing terminal that includes a second processor, the program, when executed, causing the image processing apparatus to perform an image processing method comprising:

running a document scanning application, by the second processor, selected from among a plurality of applications provided at the information processing terminal to generate an electronic document relating to tax exemption that includes a corresponding input field for inputting the target information including purchaser information relating to a purchaser of a tax exempt article, and inputting the target information to the corresponding input field;

controlling the document scanning application, by the second processor, to send scan instructions to the main apparatus instructing the scanning device to scan the medium and determine position information of the scan region based on scan region setting information stored in association with the document scanning application, the scan region being provided at a specified scan size smaller than a size of the medium upon accepting a scan instruction from a user while the document scanning application is running;

controlling the scanning device, by the first processor upon the first processor receiving the scan instructions from the information processing terminal, to scan the scan region of the medium, the scan region including a region of the medium on which the target information is printed, and capture image data of the scan region at the specified scan size indicated in the received scan instructions and the determined position information of the scan region indicated in the scan region setting information, the medium being identification documentation of the purchaser of the tax-exempt article;

executing a character recognition process, by the second processor, on the image data of the scan region at the specified scan size captured by the scanning device to acquire the target information; and controlling the document scanning application, by the second processor, to generate the electronic document including the target information acquired by the character recognition process input to the corresponding input field, wherein the scan region setting information stored in association with the document scanning application is set up in advance of accepting the scan instruction from the user.

27. The non-transitory computer-readable medium according to claim 26, wherein execution of the stored program further causes the image processing apparatus to perform processes of:

determining whether an orientation of the medium matches a specified orientation of the medium;

acquiring position information of the scan region, by the second processor, based on scan region setting information stored in association with the document scanning application in a case where the orientation of the medium matches the specified orientation;

generating a screen to be displayed on a display of the image processing apparatus in a case where the orientation of the medium does not match the specified orientation, the generated screen indicating that the orientation of the medium does not match the specified orientation; and preventing further processing of the medium until the orientation of the medium is adjusted to match the specified orientation.

28. The non-transitory computer-readable medium according to claim 26, wherein the electronic document including the corresponding input field for inputting the target information is stored in a storage device that is provided at either of the main apparatus or the information processing terminal.

29. The non-transitory computer-readable medium according to claim 26, wherein the purchaser information included in the target information relates to one or more of the purchaser's nationality, name, or date-of-birth.

* * * * *